US012626677B2

(12) United States Patent
Gini

(10) Patent No.: US 12,626,677 B2
(45) Date of Patent: May 12, 2026

(54) VALVE CASINGS AND ASSEMBLIES FOR VALVE-BASED MUSICAL INSTRUMENTS AND METHODS FOR MANUFACTURING SAME

(71) Applicant: Julie Lynn Darling, Spencer, WV (US)

(72) Inventor: Gary J. Gini, Spencer, WV (US)

(73) Assignee: Julie Lynn Darling, Spencer, WV (US)

( * ) Notice: Subject to any disclaimer, the term of this patent is extended or adjusted under 35 U.S.C. 154(b) by 269 days.

(21) Appl. No.: 18/415,340

(22) Filed: Jan. 17, 2024

(65) Prior Publication Data

US 2024/0249704 A1 Jul. 25, 2024

Related U.S. Application Data

(60) Provisional application No. 63/480,655, filed on Jan. 19, 2023.

(51) Int. Cl.
*G10D 9/04* (2020.01)

(52) U.S. Cl.
CPC .................................... *G10D 9/04* (2013.01)

(58) Field of Classification Search
CPC ............... G10D 9/04; G10D 9/00; G10D 7/00
See application file for complete search history.

(56) References Cited

U.S. PATENT DOCUMENTS

| | | | | |
|---|---|---|---|---|
| 5,965,832 | A | 10/1999 | Davidson | |
| 6,008,444 | A | 12/1999 | Chesko et al. | |
| 2010/0236379 | A1* | 9/2010 | Wilk | G10D 9/04 84/390 |
| 2016/0086587 | A1 | 3/2016 | John et al. | |

FOREIGN PATENT DOCUMENTS

| | | | |
|---|---|---|---|
| JP | 4960377 | B2 | 6/2012 |
| KR | 10-2020-0013842 | A | 2/2020 |

OTHER PUBLICATIONS

Korean Intellectual Property Office, International Search Report and Written Opinion issued in corresponding Application No. PCT/US2024/011838 mailed May 14, 2024.

Wilfried Kausel, Daniel W. Zietlow, and Thomas R. Moore. Influence of wall vibrations on the sound of brass wind instruments. J. Acoust. Soc. Am., vol. 128, No. 5 pp. 3161-3174 (Nov. 2010).

Vasileios Chatziioannou, Saranya Balasubramanian, and Wilfried Kausel. Vibroacoustic Analysis of Trumpet Wall Vibrations. ICSV26, Montreal pp. 1-7 (Jul. 2019).

* cited by examiner

*Primary Examiner* — Kimberly R Lockett
(74) *Attorney, Agent, or Firm* — Stites & Harbison, PLLC; Gary N. Stewart

(57) ABSTRACT

A valve casing includes a body that defines a plurality of channels for receiving a plurality of valves and a plurality of ports. The plurality of ports include one or more inner ports, which place two adjacently positioned channels in fluid communication with each other, and a plurality of outer ports for directing a flow of air out of the valve casing or receiving the flow of air into the valve casing. One or more areas between adjacently positioned channels can be partially or completely filled with a mass to attenuate the vibration incurred by the valve casing as the flow of air is directed therethrough. One or more of the outer ports can be defined by a curved protuberance to provide a more ergonomic and comfortable playing arrangement during use of a musical instrument in which the valve casing is implemented.

19 Claims, 17 Drawing Sheets

VALVE CASINGS AND ASSEMBLIES FOR VALVE-BASED MUSICAL INSTRUMENTS AND METHODS FOR MANUFACTURING SAME

CROSS-REFERENCE TO RELATED APPLICATIONS

The present application claims priority to U.S. Patent Application Ser. No. 63/480,655 filed on Jan. 19, 2023, the entire disclosure of which is incorporated herein by reference.

BACKGROUND OF THE INVENTION

The presently disclosed subject matter relates to valve casings and assemblies for valve-based musical instruments and methods for manufacturing the same.

Most instruments within the brass wind instrument family (e.g., trumpets, cornets, flugelhorns, alto horns, tenor horns, baritone horns, euphoniums, tubas, and the like) utilize valves which can be selectively manipulated to affect the sound emitted from the instrument. For instance, many trumpets utilize a piston valve system 10, such as that shown in FIGS. 1 and 2. As shown in FIGS. 1 and 2, a piston valve system 10 of known construction typically includes multiple, individual valve casings 12, 14, 16 which are in fluid communication with each other through a series of connecting tubes 13, 15, and which are configured to receive and house the pistons of piston valves 32, 34, 36. A piston valve system 10 of known construction also typically further includes a plurality of additional interconnecting tubes 17, 18, 19, 20, 21, 22, 23, 24 which place the respective valve casings 12, 14, 16 in fluid communication with other components of the musical instrument in which the piston valve system 10 is integrated, such as a lead pipe, tuning slides, or a tail of a bell of the musical instrument. To provide additional structural support and reduce the strain on the connecting tubes 13, 15 responsible for placing the respective valve casings 12, 14, 16 in fluid communication with each other, a traditional piston valve system 10 also typically includes a plurality of metal balusters 26, 27, 28, 29 which interconnect the respective valve casings 12, 14, 16.

Despite the additional bracing provided by the metal balusters 26, 27, 28, 29, however, and referring still to FIGS. 1 and 2, the respective valve casings 12, 14, 16 are still only connected to each other at a limited number of small, discrete positions along their length, thus resulting in the presence of large areas of unfilled space (or gaps) between adjacently positioned valve casings 12, 14, 16. As a result of such unfilled space, the valve casings 12, 14, 16 are prone to vibration as air is directed through the piston valve system 10. It has previously been demonstrated that the occurrence of vibrations within brass instruments can affect their acoustical output.[1, 2] Accordingly, the vibrations incurred by the valve casings 12, 14, 16 and connecting tubes 17, 18, 19, 20, 21, 22, 23, 24 while in use may contribute to acoustic loss or otherwise affect or alter the sound ultimately emitted by the musical instrument when played.

Accordingly, valve casings and assemblies which reduce or eliminate vibrations incurred by the valve system of which it is a part would be both beneficial and desirable.

To manufacture the above-described piston valve system 10 of known construction, and referring still to FIGS. 1 and 2, the valve casings 12, 14, 16 are first formed by cutting multiple tubes and boring them to the correct dimension to house the piston of each piston valve 32, 34, 36. Each valve casing 12, 14, 16 is then threaded at both ends to accommodate receiving both a top cap 41, 43, 45 and a bottom cap 42, 44, 46 for the respective piston valves 32, 34, 36. Ports (in different positions and numbers, depending on the particular valve position within the piston valve system 10) are then milled into each of the valve casings 12, 14, 16. The connecting tubes 13, 15, 17, 18, 19, 20, 21, 22, 23, 24 are then inserted into corresponding ports of the respective valve casings 12, 14, 16, and, along with the metal balusters 26, 27, 28, 29, are assembled in a jig to securely hold the individual components still and in the correct position so that they can be fixed in place via brazing. The interior of each valve casing 12, 14, 16 is then further bored and honed to the finished dimensions required to accommodate the pistons of the piston valves 32, 34, 36. Each valve casing 12, 14, 16 is then finished by sanding and polishing in preparation to be mated with corresponding components of the musical instrument, such as the lead pipe, the respective tuning slides, or the tail of the bell. When attaching the slide tubes for each of the tuning slides and the bell, an oversized metal ferrule (or union) connects the corresponding connecting tubes 17, 18, 19, 20, 21, 22, 23, 24 of the respective valve casings 12, 14, 16 to the lead pipe, the inner or outer slide tubes (configuration dependent), or tail of the bell. These joints are then soldered together with a lead/tin or other low temperature soft solder. Bracing is then added to the ends of the outermost positioned valve casings 12, 16 and soft soldered to other components of the musical instrument, such as the lead pipe and midsection of the bell, to complete integration of the piston valve system 10 into the musical instrument.

Accordingly, the manufacturing process required to construct piston valve systems of known construction is both labor intensive and time consuming, which, in turn, results in high production costs for manufacturers. Therefore, manufacturing techniques which reduce the labor and/or costs necessitated for the manufacture of musical instrument valve systems would be both beneficial and desirable.

In trumpets, a piston valve system 10 of known construction is typically integrated in the trumpet such that the valve casings 12, 14, 16 are in parallel with the components of the trumpet to which they are attached. This arrangement forces individuals to hold and use the instrument in a playing position which can contribute to physical fatigue and/or injury, such as repetitive strain injury, tendonitis, carpal tunnel syndrome, etc.

Accordingly, valve casings and assemblies which enable individuals to more comfortably engage the valve system of a musical instrument while playing would thus be both beneficial and desirable.

SUMMARY

The presently disclosed subject matter meets some or all of the above-identified needs, as will become evident to those of ordinary skill in the art after a study of information in this document.

This Summary describes several embodiments of the presently disclosed subject matter and, in many cases, lists variations and permutations of these embodiments. This Summary is merely exemplary of the numerous and varied embodiments. Mention of one or more representative features of a given embodiment is likewise exemplary. Such an embodiment can typically exist with or without the feature (s) mentioned; likewise, those features can be applied to other embodiments of the presently disclosed subject matter, whether listed in this Summary or not. To avoid excessive repetition, this Summary does not list or suggest all possible combinations of such features or all embodiments disclosed herein.

An exemplary valve casing made in accordance with the present disclosure includes: a body that defines a plurality of channels and a plurality of ports. The plurality of channels are configured to receive a plurality of valves for directing a flow of air received by the valve casing. The plurality of ports include one or more inner ports, which place two adjacently positioned channels in fluid communication with each other, and a plurality of outer ports for directing the flow of air out of the valve casing or receiving the flow of air into the valve casing. One or more areas of the valve casing located between adjacently positioned channels is at least partially filled with a mass to attenuate the vibration incurred by the valve casing as the flow of air is directed therethrough and reduce acoustic loss.

In some embodiments, each area is at least partially filled by a mass that is located adjacent to, above, or below an inner port of the valve casing. In some embodiments, the mass filling each respective area of the one or more areas between adjacently positioned channels is defined by a portion of the body. In some embodiments, multiple areas located between adjacently positioned channels are filled by a mass. In one such embodiment, each of the multiple areas located between adjacently positioned channels is completely filled by a mass defined by a portion of the body. In some embodiments, the valve casing weighs between about 500 grams to about 2500 grams.

In some embodiments, the body is comprised of one or more body members, where each respective body member at least partially defines the plurality of channels. In one such embodiment, the one or more areas located between adjacently positioned channels is at least partially filled by a mass defined by a portion of the one or more body members. In some embodiments, the one or more body members includes a first body member and a second body member joined to the first body member. The first body member defines a first portion of the plurality of channels, and the second body member defines a second portion of the plurality of channels as well as the plurality of ports of the valve casing. In some embodiments, the second body member may define one or more grooves for each channel of the valve casing, with each groove being configured to receive a valve guide (tab). In some embodiments, the first body member defines an outer edge and a recess, and the second body member defines a ledge upon which the outer edge of the first body member can be seated. In some embodiments, a top of the second body member defining the one or more grooves for each channels is nested within the recess of the first body member when the outer edge of the first body member is seated on the ledge of the second body member.

In some embodiments, the plurality of outer ports includes a first outer port that is configured to receive a portion of a conduit for directing a flow of air. The first outer port is defined by a portion of the body which is curved, such that, when the portion of the conduit is received in the first outer port, a longitudinal axis defined by the conduit and a plane along which a first face of a central portion of the body resides intersect at an angle ranging from about 1° to about 20°.

In some embodiments, an exemplary valve casing made in accordance with the present disclosure can include: a body that includes a central body portion and a plurality of protuberances. The central body portion includes a plurality of channels, and one or more inner ports. The plurality of channels are configured to receive a plurality of valves for directing a flow of air received by the valve casing. Each inner port places two adjacently positioned channels in fluid communication with each other. The plurality of protuberances extend from the central body portion. Each respective protuberance defines one or more outer ports for directing the flow of air out of the valve casing or into the valve casing. The plurality of protuberances include a first protuberance that is configured to receive a first conduit for directing the flow of air. The first protuberance is curved, such that, when the first conduit is received in the first protuberance, a longitudinal axis defined by the first conduit and a plane along which a first face of the central body portion resides intersect at an angle ranging from about 1° to about 20°. In some embodiments, the longitudinal axis defined by the first conduit and the plane along which the first face of the central body portion resides intersect at an angle ranging from about 3° to about 12°.

In some embodiments, the plurality of protuberances include a second protuberance that is configured to receive a second conduit for directing the flow of air. The second protuberance is curved, such that, when the second conduit is received in the first protuberance, a longitudinal axis defined by the second conduit and a plane along which a second face of the central body portion resides intersect at an angle ranging from about 1° to about 20°. In some embodiments, the longitudinal axis defined by the second conduit and the plane along which the second face of the central body portion resides intersect at angle ranging from about 3° to about 12°.

In some embodiments, the body is comprised of multiple body members. In some embodiments, the body includes a first body member and a second body member that is joined to the first body member. The first body member defines a first section of the central body portion, and the second body member defines a second section of the central body portion as well as the plurality of protuberances, with the first section and the second section of the central body portion each partially defining the plurality of channels.

An exemplary assembly for a valve-based instrument includes: a valve casing; a first conduit for directing a flow of air into the valve casing; and a second conduit for directing the flow of air away from the valve casing. The valve casing includes a central body portion and a plurality of protuberances. The central body portion includes a plurality of channels, and one or more inner ports. The plurality of channels are configured to receive a plurality of valves for directing a flow of air received by the valve casing. Each inner port places two adjacently positioned channels in fluid communication with each other. The plurality of protuberances extend from the central body portion. Each respective protuberance defines one or more outer ports for directing the flow of air out of the valve casing or into the valve casing. The plurality of protuberances include a first protuberance in which the first conduit is received. The first protuberance is curved, such that, when the first conduit is received in the first protuberance, a longitudinal axis defined by the first conduit and a plane along which a first face of the central body portion resides intersect at an angle ranging from about 1° to about 20°. The plurality of protuberances further includes a second protuberance in which the second conduit is received. The second protuberance is curved, such that, when the second conduit is received in the second protuberance, a longitudinal axis defined by the second conduit and a plane along which a second face of the central body portion resides intersect at an angle ranging from about 1° to about 20°. In some embodiments, the valve based musical instrument is a trumpet including a lead pipe, a main tuning slide in fluid communication with the lead pipe, and a bell. In some embodiments, the first conduit is in fluid communication with the main tuning slide, and the second conduit is in fluid communication with a tail of the bell.

Methods for manufacturing a valve casing made in accordance with the present disclosure are also provided.

Further features and advantages of the present disclosure will become evident to those of ordinary skill in the art after a study of the description, figures, and non-limiting examples in this document.

DESCRIPTION OF EXEMPLARY EMBODIMENTS

Figure 1:
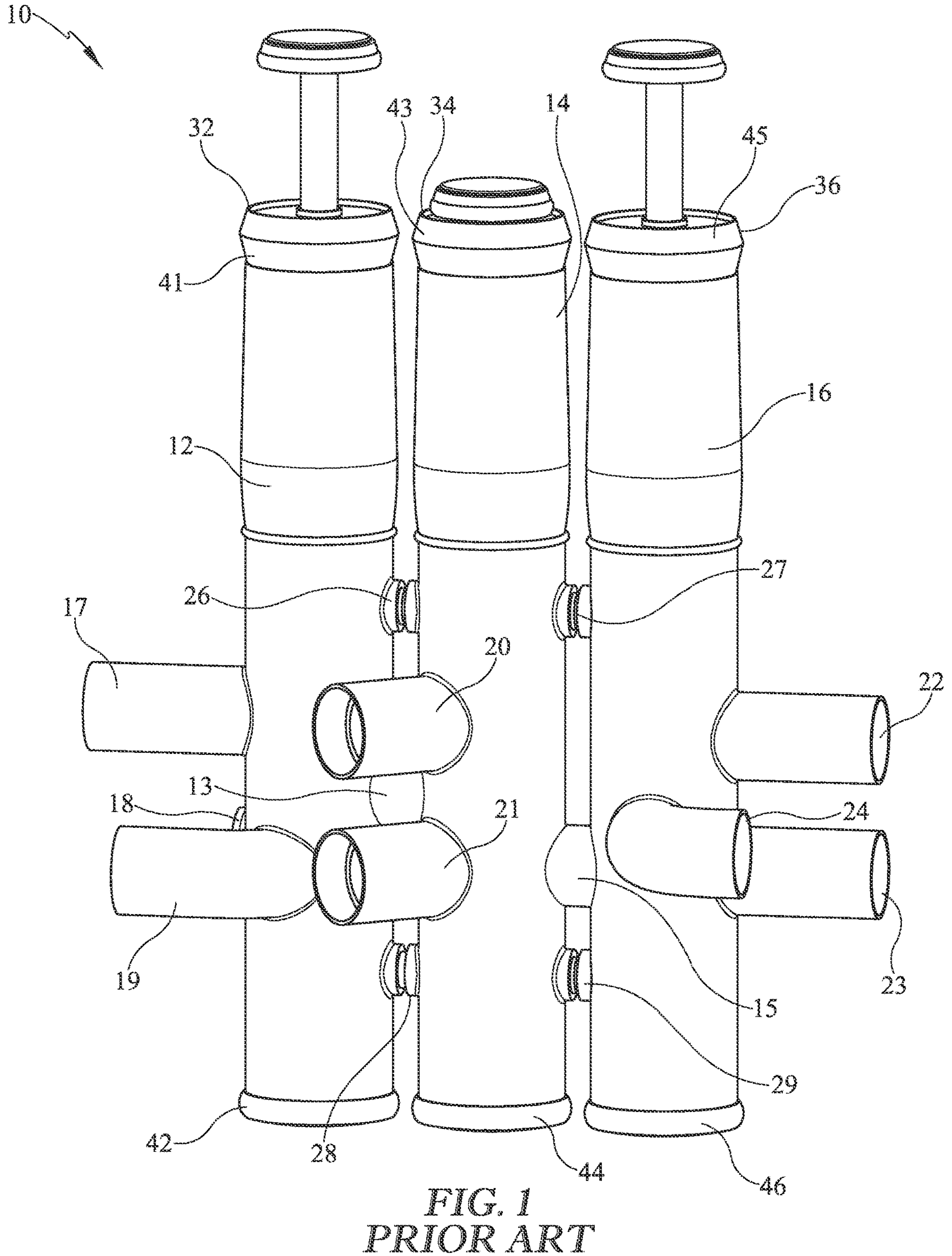
FIG. 1 PRIOR ART
FIG. 1 is a front perspective view of a prior art valve system.

The presently disclosed subject matter includes valve casings for valve-based musical instruments. Each valve casing disclosed includes a plurality of channels configured to receive a plurality of valves for directing a flow of air received by the valve casings, one or more inner ports which place two adjacently positioned channels in fluid communication with each other, and a plurality of outer ports for directing the flow of air out of the valve casings or receiving the flow of air into the valve casings. In some embodiments, a valve casing made in accordance with the present disclosure includes one or more areas which are located between adjacently positioned channels of the valve casing and which are partially or completely filled with a mass. In use, the mass provided in such areas reinforces and attenuates vibration in the valve casing as air flows therethrough to reduce acoustic loss when a musical instrument including the valve casing is played. In some embodiments, a valve casing made in accordance with the present disclosure includes a plurality of protuberances, which extend from a central body portion of the valve casing and define the outer ports of the valve casing. In some embodiments, the plurality of protuberances include one or more protuberances that define an outer port in which a conduit for directing air into or away from the valve casing can be received. Such protuberances can, in some embodiments, be curved to provide a more ergonomic and comfortable playing arrangement during use of a musical instrument in which the valve casing is a part. Assemblies utilizing, and methods of manufacturing, valve casings made in accordance with the present disclosure are also disclosed.

The terms "comprising" and "including" and "having" and "involving" (and similarly "comprises", "includes," "has," and "involves") and the like are used interchangeably and have the same meaning. Specifically, each of the terms is defined consistent with the common United States patent law definition of "comprising" and is therefore interpreted to be an open term meaning "at least the following," and is also interpreted not to exclude additional features, limitations, aspects, etc. Thus, for example, "a process involving steps a, b, and c" means that the process includes at least steps a, b and c. Furthermore, following long-standing patent law convention, the terms "a", "an", and "the" refer to "one or more" when used in this application, including the claims.

Wherever any of the phrases "for example," "such as," "including" and the like are used herein, the phrase "and without limitation" is understood to follow unless explicitly stated otherwise. Similarly "an example," "exemplary" and the like are understood to be non-limiting.

As used herein, "optional" or "optionally" means that the subsequently described event or circumstance does or does not occur and that the description includes instances where said event or circumstance occurs and instances where it does not.

As used herein, the term "about," when referring to a value or to an amount of mass, weight, time, volume, concentration or percentage is meant to encompass variations of in some embodiments ±25%, in some embodiments ±20%, in some embodiments ±10%, in some embodiments ±5%, in some embodiments ±1%, in some embodiments ±0.5%, in some embodiments ±0.1%, in some embodiments ±0.01%, and in some embodiments ±0.001% from the specified amount.

As used herein, ranges can be expressed as from "about" one particular value, and/or to "about" another particular value. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 1° and 20° are disclosed, then 2°, 3°, 4°, 5°, 6°, 7°, 8°, 9°, 10°, 11°, 12°, 13°, 14°, 15°, 16°, 17°, 18°, and 19° are also disclosed. It is further understood that where a range of units is disclosed, all subranges within that range are also disclosed. For example, if the range of 10 to 200 is disclosed, the subranges of 10 to 10°, 1° to 5°, 3° to 5°, 5° to 10°, 5° to 7°, 7° to 10°, 3° to 12°, 10° to 20°, 10° to 15°, 13° to 15°, 15° to 20°, 17° to 20°, etc. are also disclosed.

Figure 3:
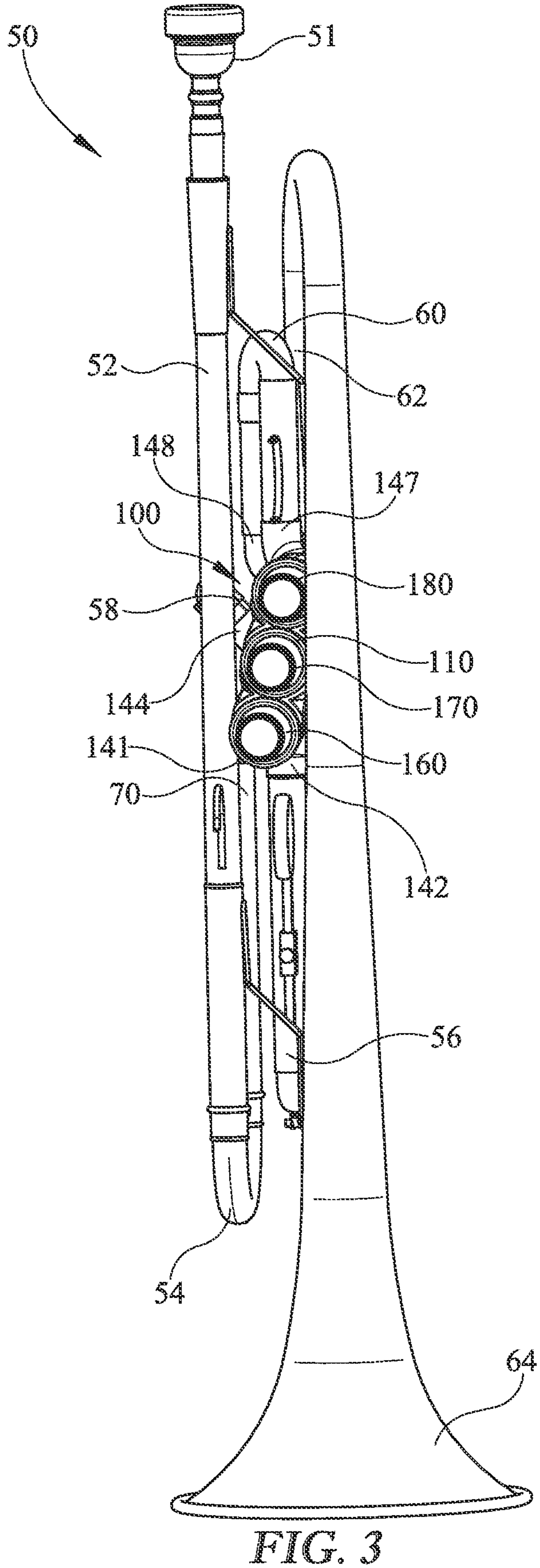
FIG. 3 is a perspective view of a valve-based musical instrument, with a valve system that includes an exemplary valve casing made in accordance with the present disclosure.

Referring first to FIG. 3, a valve-based musical instrument (or musical instrument) 50 in the form of a standard trumpet with a valve system 100 that includes an exemplary valve casing 110 made in accordance with the present disclosure is provided. As shown in FIG. 3, and further described below, the valve system 100 is configured to be placed in fluid communication with various other components of the musical instrument 50 which direct a flow of air into the valve casing 110 and/or receive the flow of air as it is emitted from the valve casing 110. When the musical instrument 50 is in use (i.e., played by a user), the user can manipulate the valve system 100 to affect the path along which the flow of air travels through the valve casing 110 prior to being directed out of the musical instrument 50, thus affecting the pitch of the sound emitted from the musical instrument 50.

Figure 4:
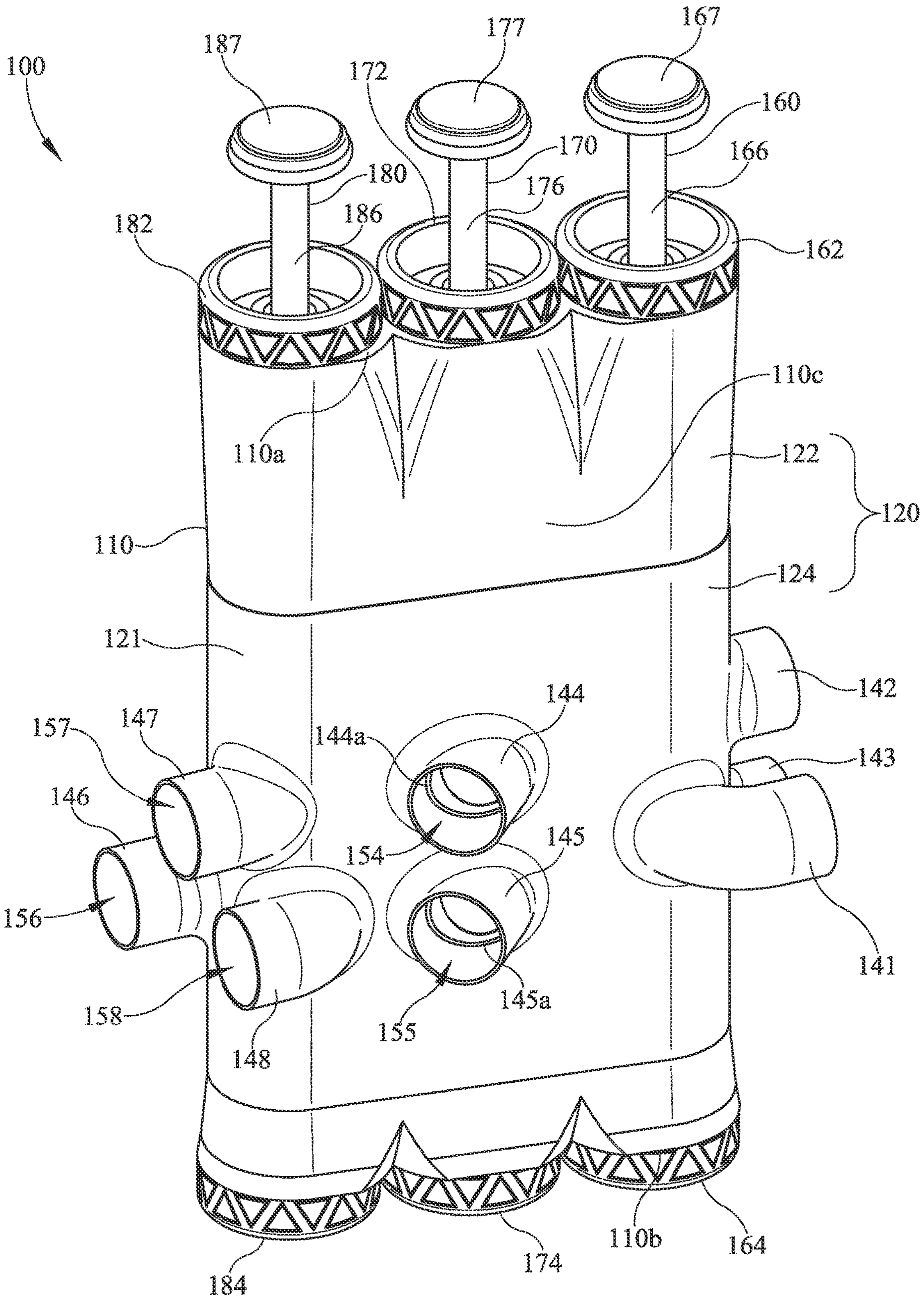
FIG. 4 is a front perspective view of the valve system of FIG. 3.
Figure 5:
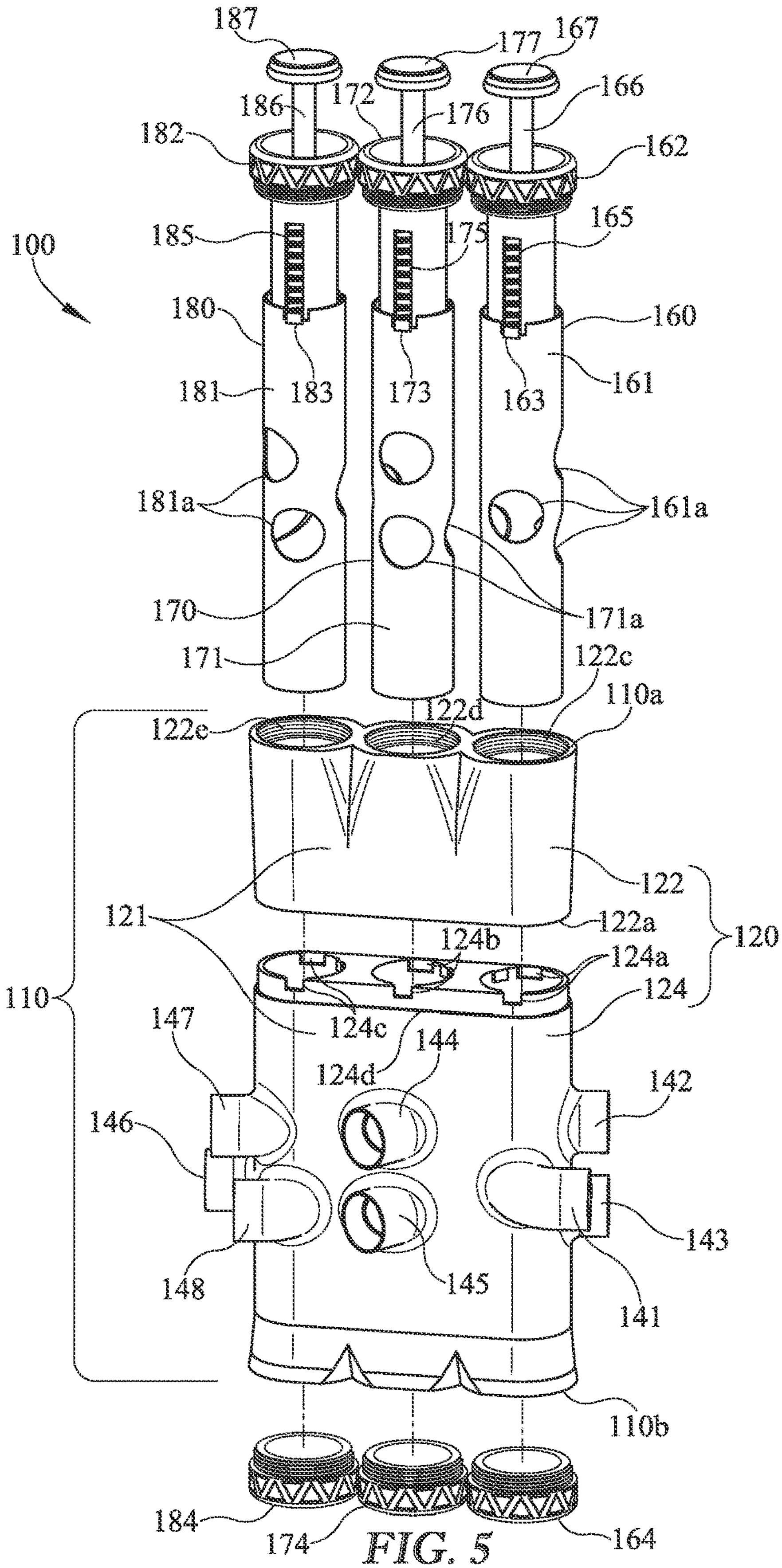
FIG. 5 is a partial exploded view of the valve system of FIG. 3.
Figure 6:
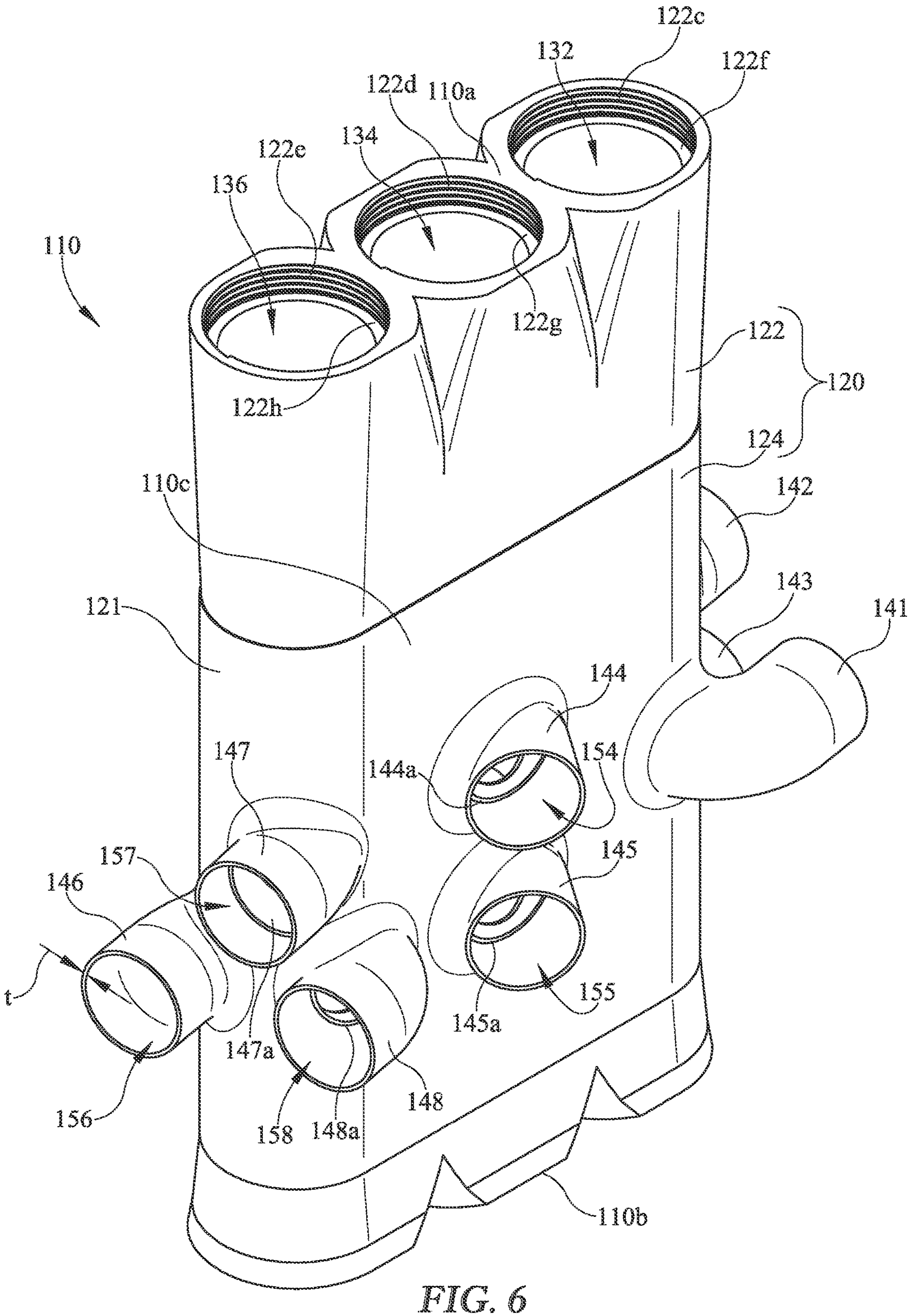
FIG. 6 is a front perspective view of the exemplary valve casing of the valve system of FIG. 3.
Figure 7:
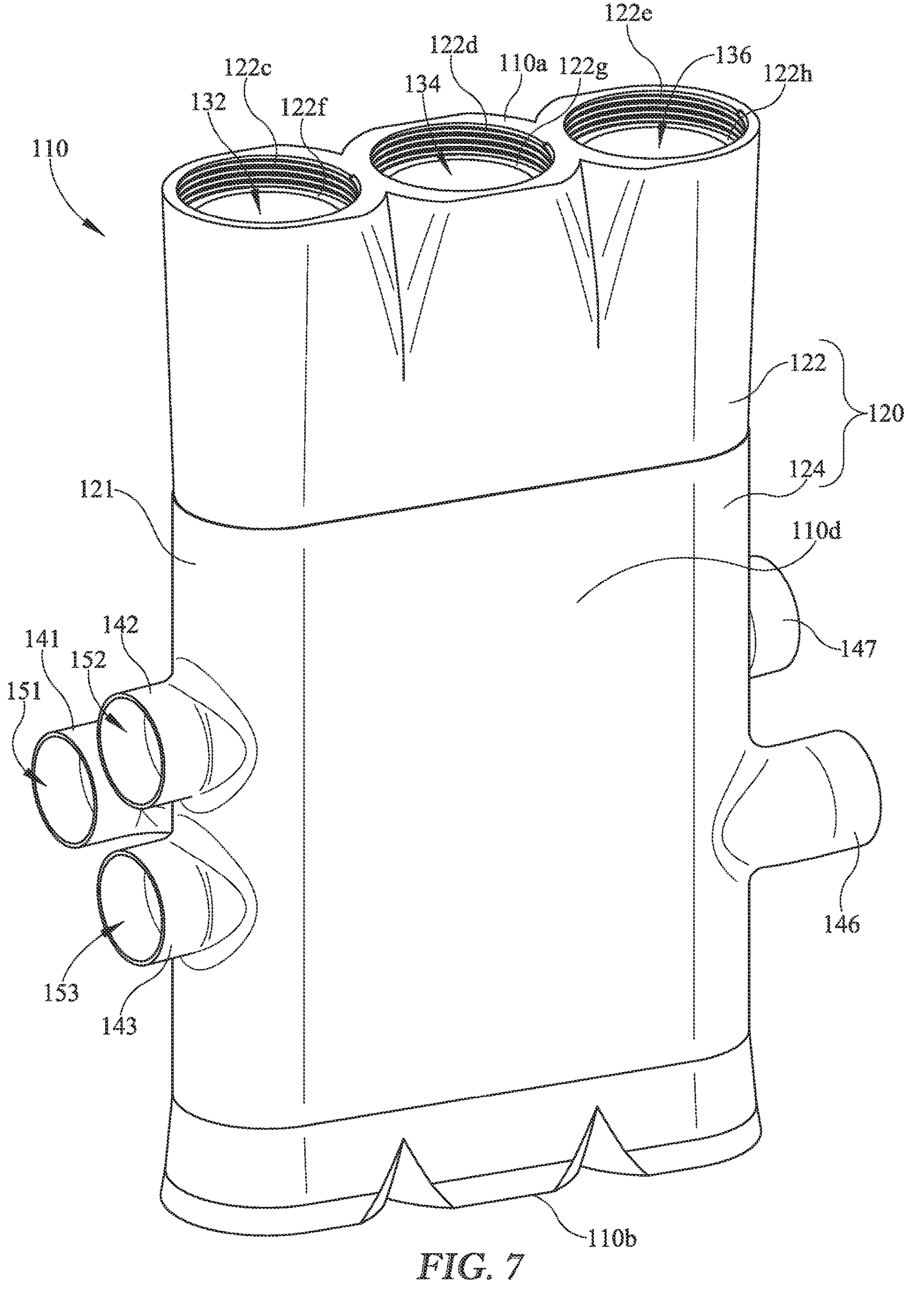
FIG. 7 is a rear perspective view of the exemplary valve casing of the valve system of FIG. 3.
Figure 8:
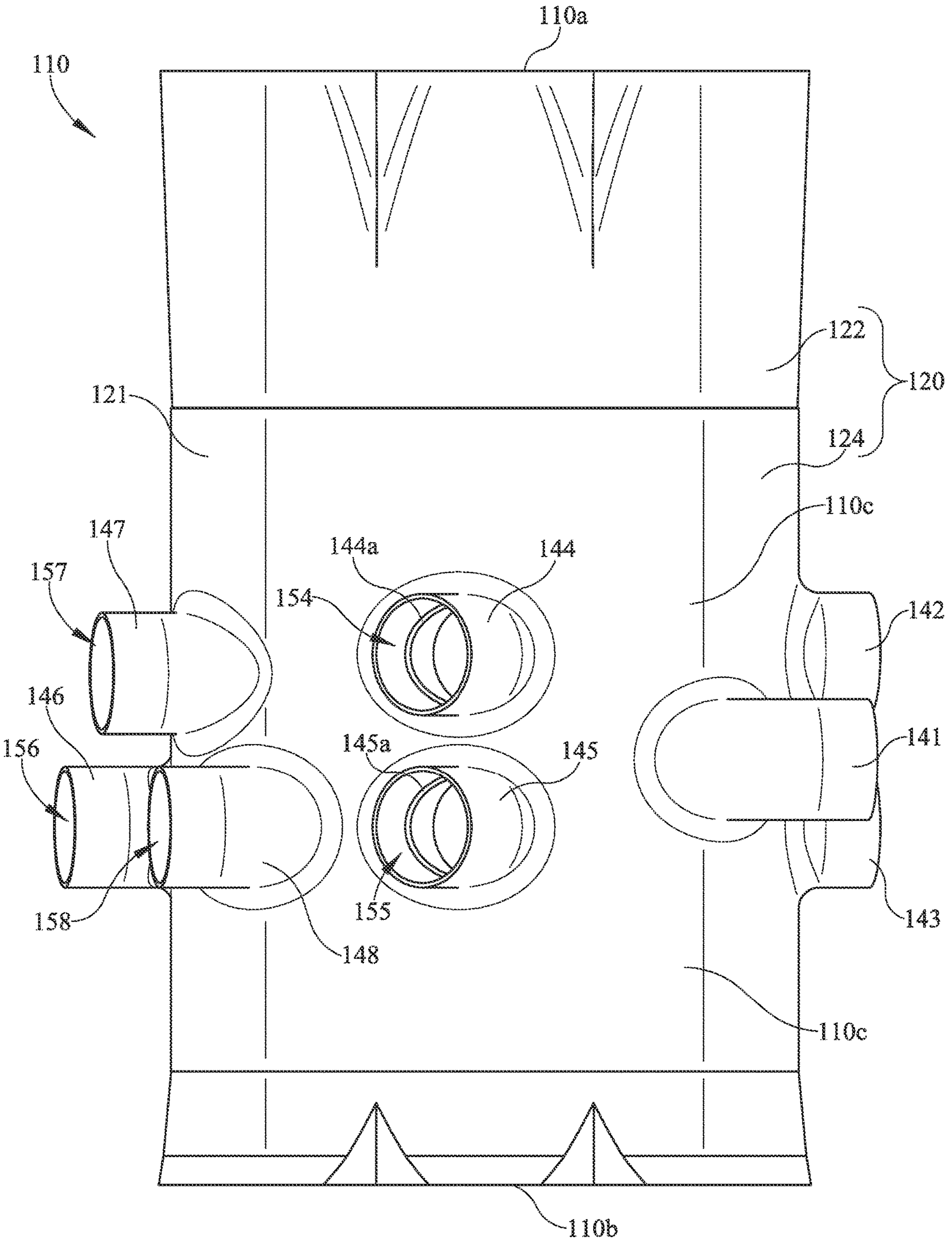
FIG. 8 is a front view of the exemplary valve casing of the valve system of FIG. 3.
Figure 9:
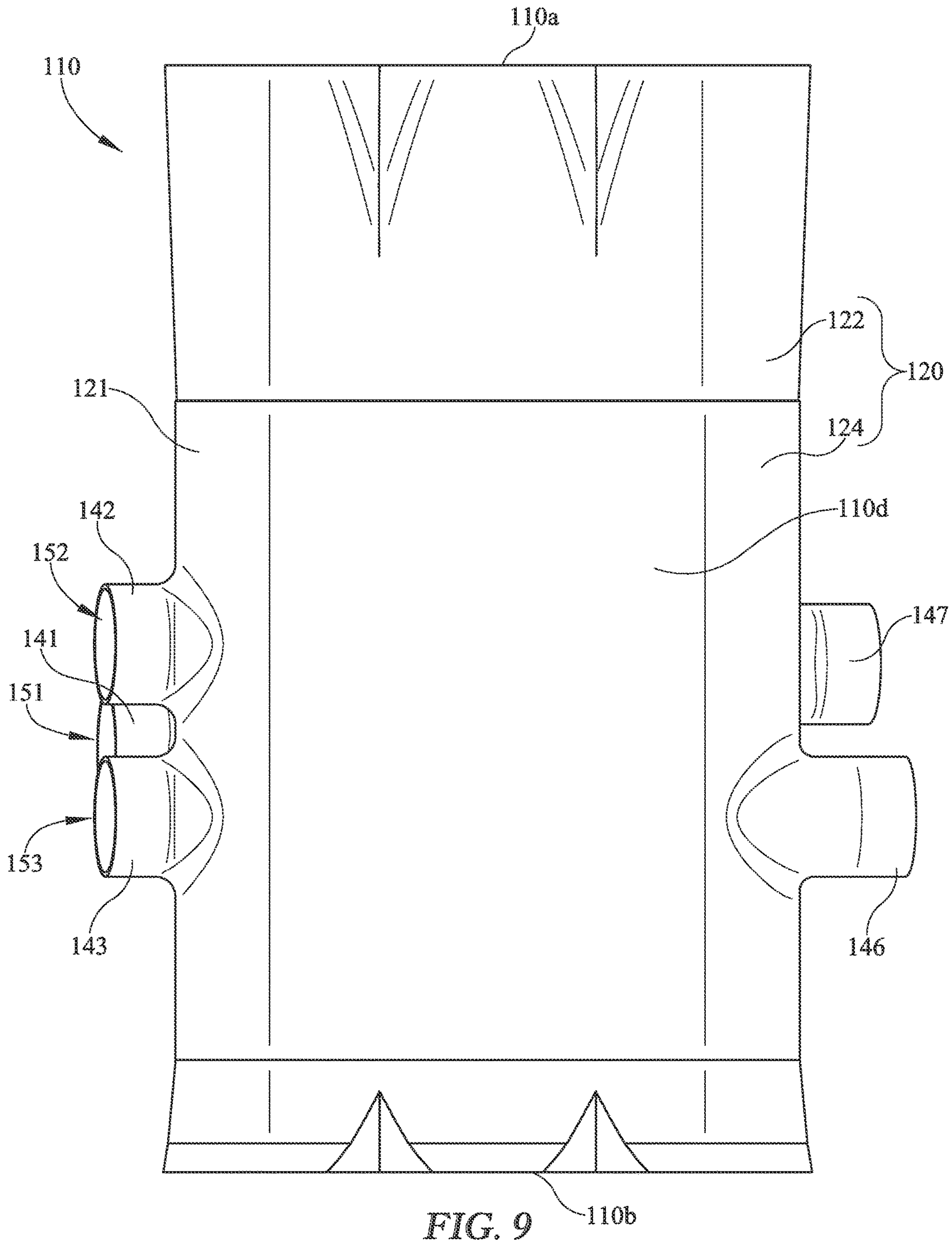
FIG. 9 is a rear view of the exemplary valve casing of the valve system of FIG. 3.
Figure 10:
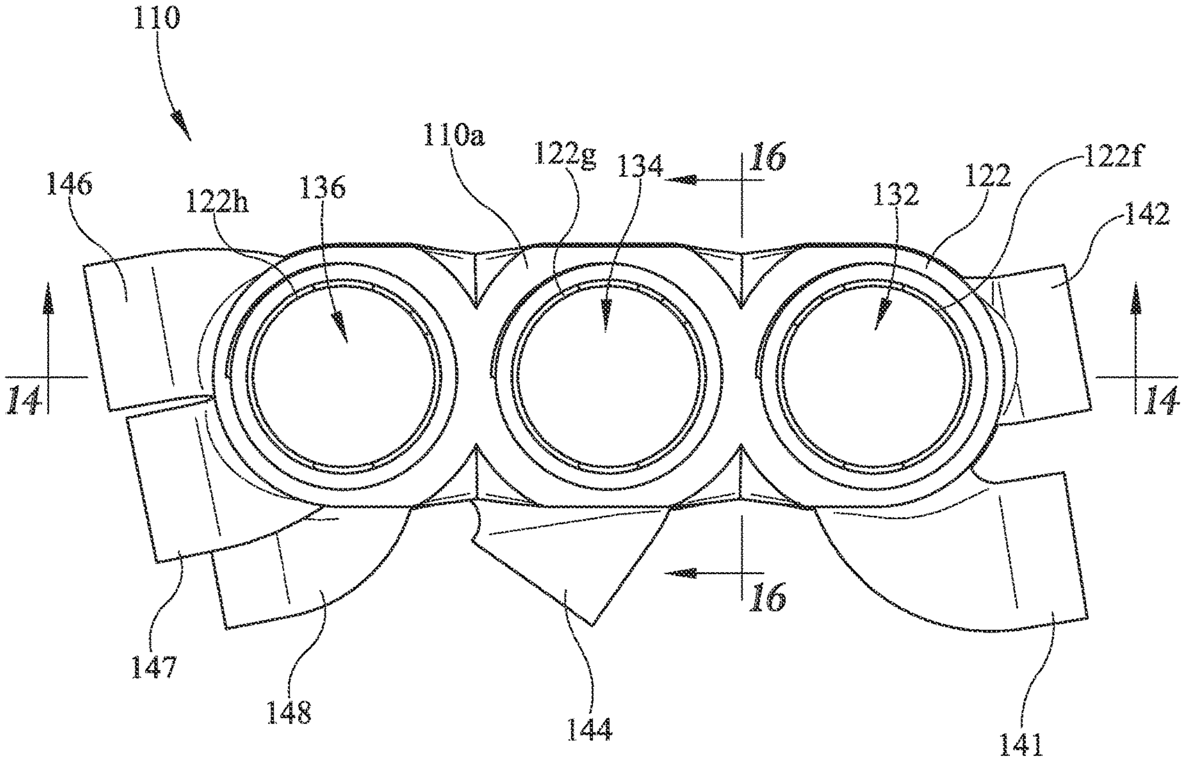
FIG. 10 is a top view of the exemplary valve casing of the valve system of FIG. 3.
Figure 11:
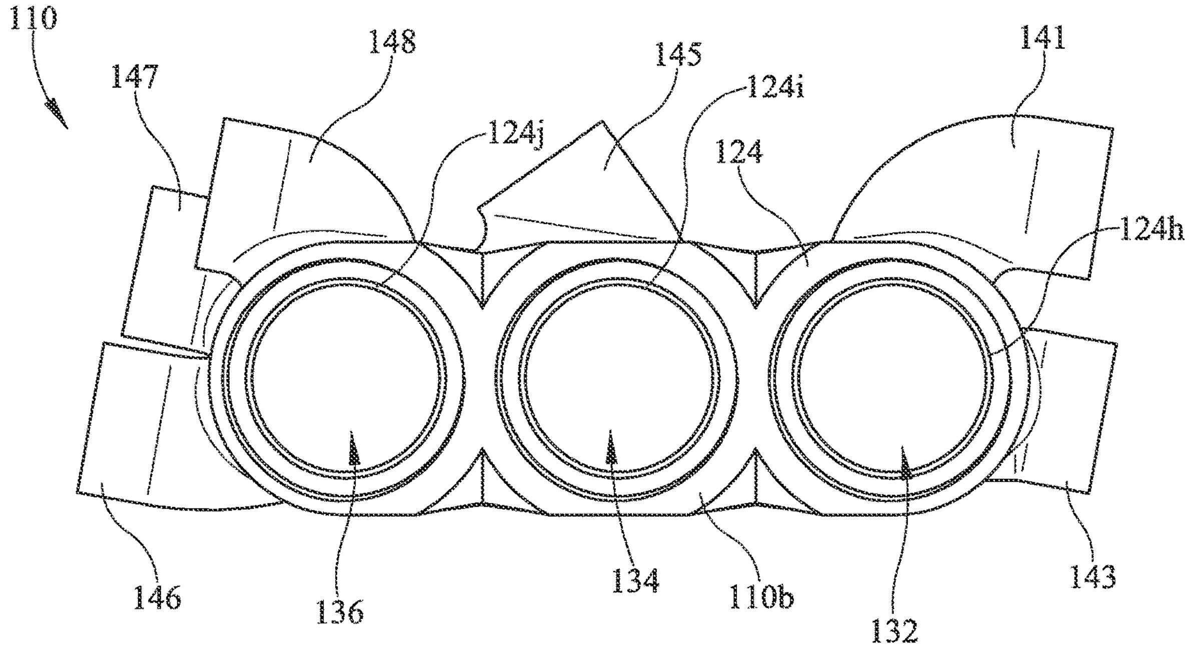
FIG. 11 is bottom view of the exemplary valve casing of the valve system of FIG. 3.
Figure 12:
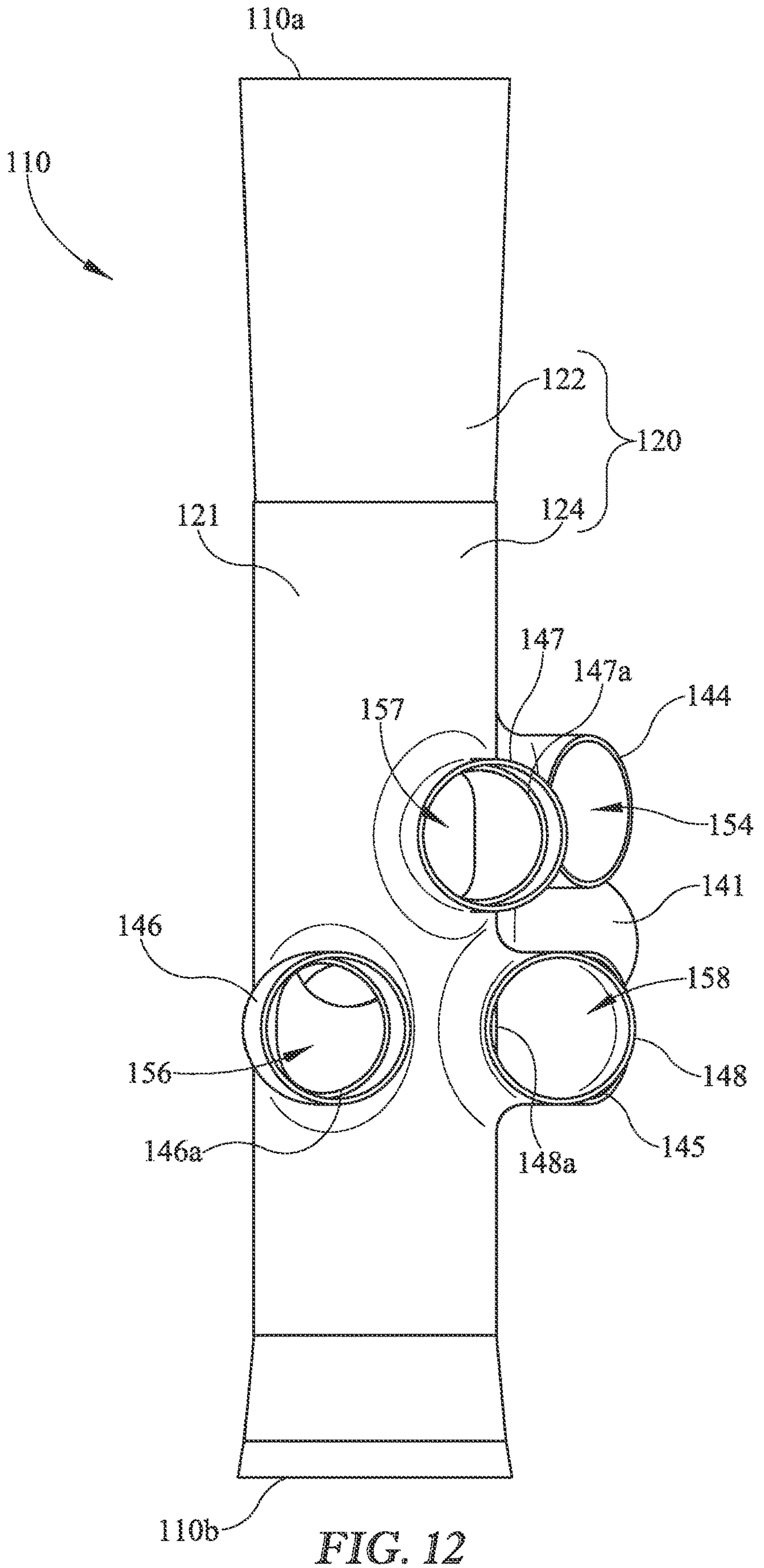
FIG. 12 is a left side view of the exemplary valve casing of the valve system of FIG. 3.
Figure 13:
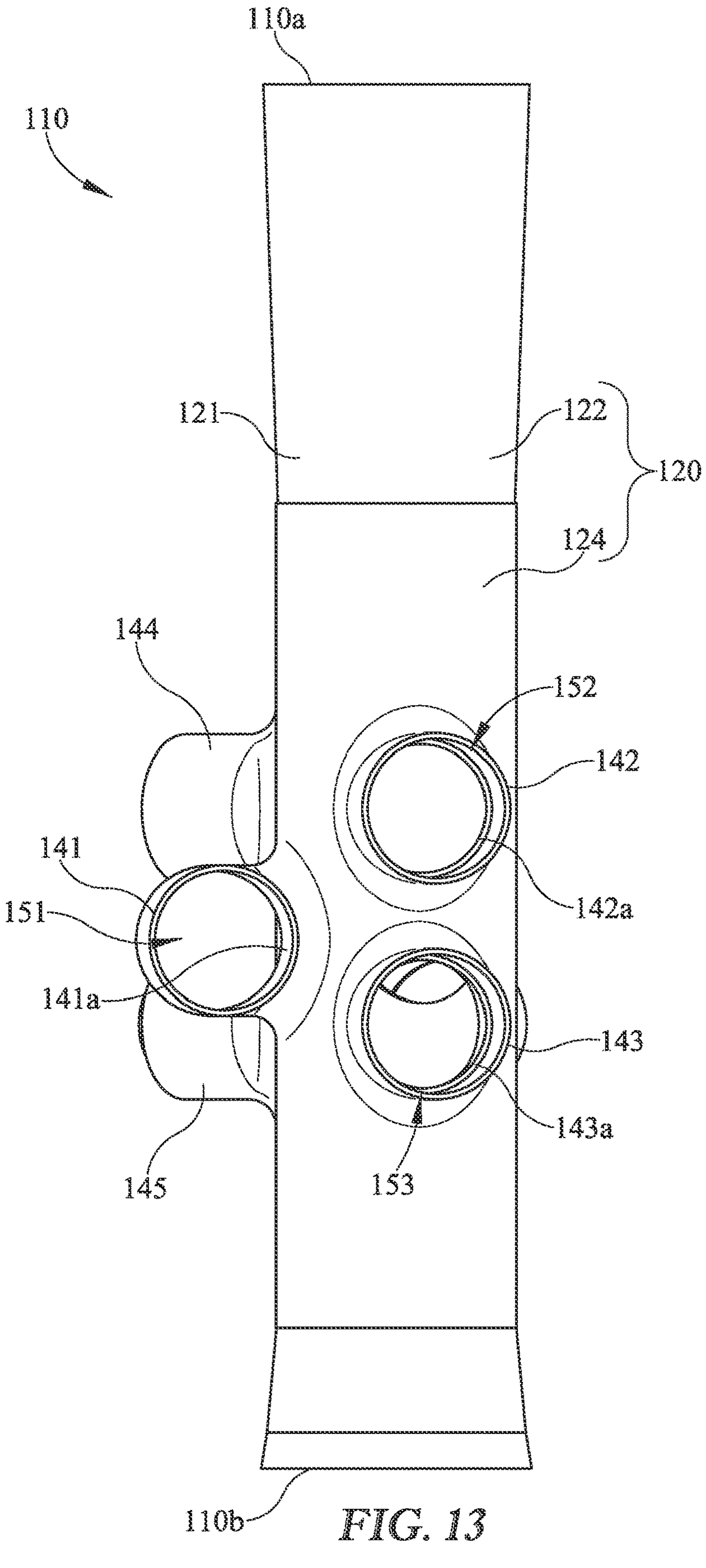
FIG. 13 is a right side view of the exemplary valve casing of the valve system of FIG. 3.

Referring now to FIGS. 3-5, the valve system 100 includes the exemplary valve casing 110 and a plurality of valves 160, 170, 180 received in the valve casing 110. In this embodiment, the valve system 100 is designed for use in a standard trumpet, and, as such, includes three valves: a first valve 160; a second valve 170; and a third valve 180. In use, the first valve 160, the second valve 170, and the third valve 180 can be selectively depressed individually or in combination to regulate the manner in which a flow of air received by the valve casing 110 is directed through the valve casing 110 to affect the sound ultimately emitted from the musical instrument 50. In this embodiment, the first valve 160, the second valve 170, and the third valve 180 are each a piston valve. Piston valves which may be utilized in the valve system 100 are known in the art, and typically include: a piston 161, 171, 181 that defines a plurality of openings 161*a*, 171*a*, 181*a*; one or more valve guides (or tabs) 163, 173, 183; a spring 165, 175, 185; a stem 166, 176, 186; a top cap 162, 172, 182; a bottom cap 164, 174, 184; damping/regulating felt (not shown), and a finger button 167, 177, 187, as best shown in FIG. 5. Suitable piston valves which may be utilized in the valve system 100 include the MAW valves manufactured by J. Meinlschmidt GmbH of Gerestried, Germany. Of course, other piston valves can alternatively be utilized without departing from the spirit and scope of the present disclosure.

Referring now to FIGS. 4-16, the valve casing 110 is comprised of a body 120 that defines a plurality of channels 132, 134, 136 and a plurality of ports 150, 151, 152, 153, 154, 155, 156, 157, 158, 159. The number of channels defined by the body 120 corresponds to the number of valves within the valve system 100. Accordingly, in this exemplary embodiment, the body 120 defines three channels: a first channel 132 that is configured to receive the first valve 160; a second channel 134 that is configured to receive the second valve 170; and a third channel 136 that is configured to receive the third valve 180. The plurality of ports 150, 151, 152, 153, 154, 155, 156, 157, 158, 159 is in fluid communication with the plurality of channels 132, 134, 136, such that each respective port 150, 151, 152, 153, 154, 155, 156, 157, 158, 159 is in fluid communication with at least one of the first channel 132, the second channel 134, and the third channel 136. The plurality of channels 132, 134, 136 and the plurality of ports 150, 151, 152, 153, 154, 155, 156, 157, 158, 159 thus collectively define various pathways through the valve casing 110 along which a flow of air received by the valve casing 110 can travel. The particular pathway taken by a flow of air through the valve casing 110 at a given time will ordinarily depend on which of the first valve 160, the second valve 170, and the third valve 180 are depressed at such time.

Referring now specifically to FIGS. 4-9 and 12-15, the plurality of ports 150, 151, 152, 153, 154, 155, 156, 157, 158, 159 can be characterized as including inner ports 150, 159 for directing the flow of air between channels 132, 134, 136, and outer ports 151, 152, 153, 154, 155, 156, 157, 158 for directing the flow of air out of the valve casing 110 or receiving the flow of air into the valve casing 110. As shown best in FIG. 14, the channels 132, 134, 136 in the valve casing 110 positioned adjacent to each other are in fluid communication with each other via an inner port 150, 159 that extends between the adjacently positioned channels. Specifically, in this exemplary embodiment, the plurality of ports 150, 151, 152, 153, 154, 155, 156, 157, 158, 159 includes two inner ports: a first inner port 150 which extends between the first channel 132 and the second channel 134 and places such channels in fluid communication with each other; and a second inner port 159 which extends between the second channel 134 and the third channel 136 and places such channels in fluid communication with each other. In this exemplary embodiment, the valve casing 110 includes a total of eight outer ports, including: a first outer port 151 that is in fluid communication with the first channel 132; a second outer port 152 that is in fluid communication with the first channel 132; a third outer port 153 that is in fluid communication with the first channel 132; a fourth outer port 154 that is in fluid communication with the second channel 134; a fifth outer port 155 that is in fluid communication with the second channel 134; a sixth outer port 156 that is in fluid communication with the third channel 136; a seventh outer port 157 that is in fluid communication with the third channel 136; and an eighth outer port 158 that is in fluid communication with the third channel 136.

Referring now to FIGS. 4-17, the body 120 of the valve casing 110 can be characterized as including a central body portion 121 and a plurality of protuberances 141, 142, 143, 144, 145, 146, 147, 148 which extend outwardly from the central body portion 121. The central body portion 121 defines, and can thus be characterized as including, the plurality of channels 132, 134, 136 and the inner ports 150, 159. As shown, in this exemplary embodiment, each outer port 151, 152, 153, 154, 155, 156, 157, 158 is defined by a separate protuberance 141, 142, 143, 144, 145, 146, 147, 148 of the body 120. Accordingly, in this exemplary embodiment, the body 120 includes eight protuberances: a first protuberance 141 that defines the first outer port 151; a second protuberance 142 that defines the second outer port 152; a third protuberance 143 that defines the third outer port 153; a fourth protuberance 144 that defines the fourth outer port 154; a fifth protuberance 145 that defines the fifth outer port 155; a sixth protuberance 146 that defines the sixth outer port 156; a seventh protuberance 147 that defines the seventh outer port 157; and an eighth protuberance 148 that defines the eighth outer port 158. Each respective protuberance 141, 142, 143, 144, 145, 146, 147, 148 also defines an annular wall 141*a*, 142*a*, 143*a*, 144*a*, 145*a*, 146*a*, 147*a*, 148*a*, the importance of which is further discussed below.

Figure 14:
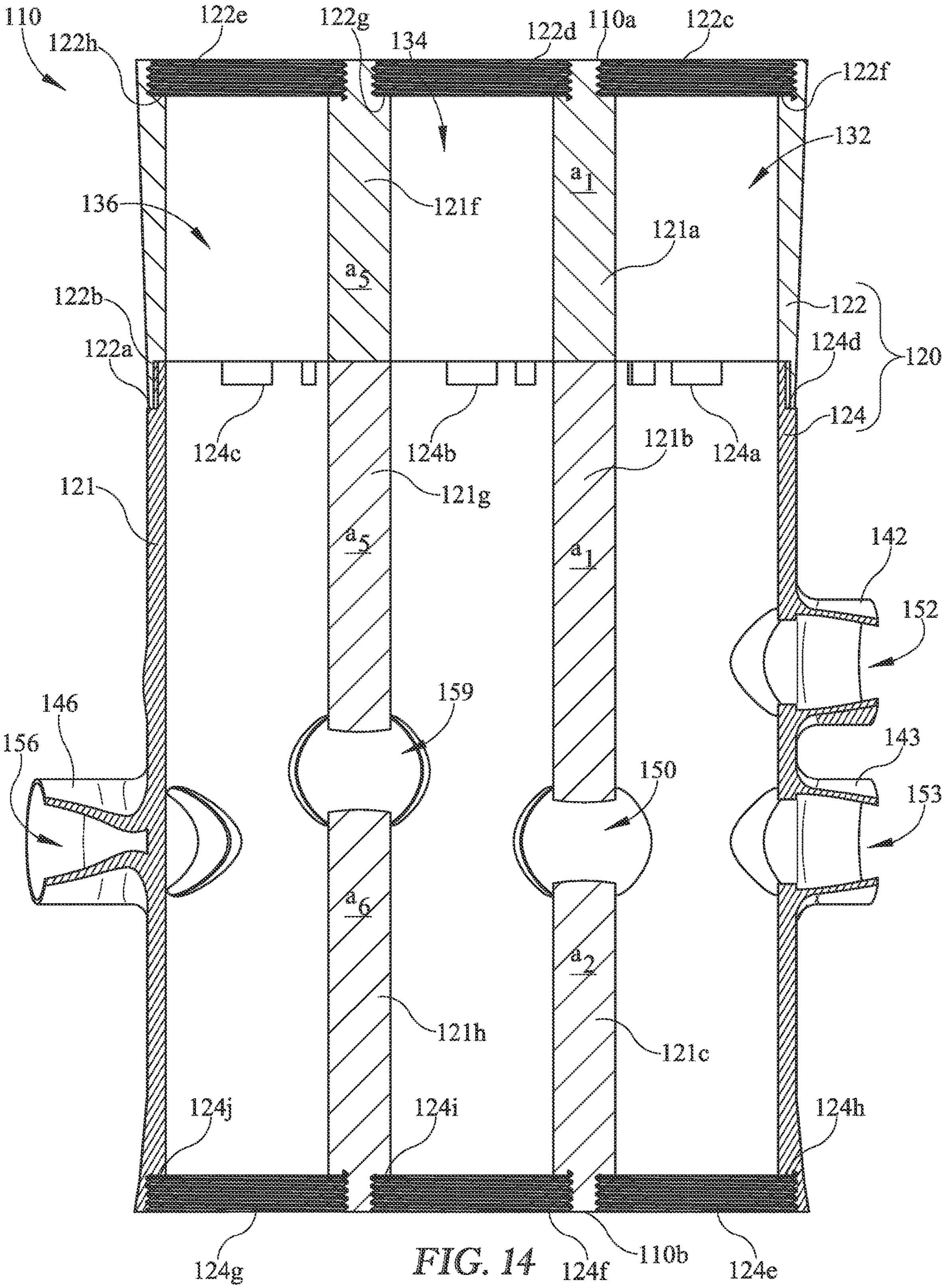
FIG. 14 is a cross-sectional view of the exemplary valve casing of the valve system of FIG. 3 taken along line 14-14 in FIG. 10.
Figure 15:
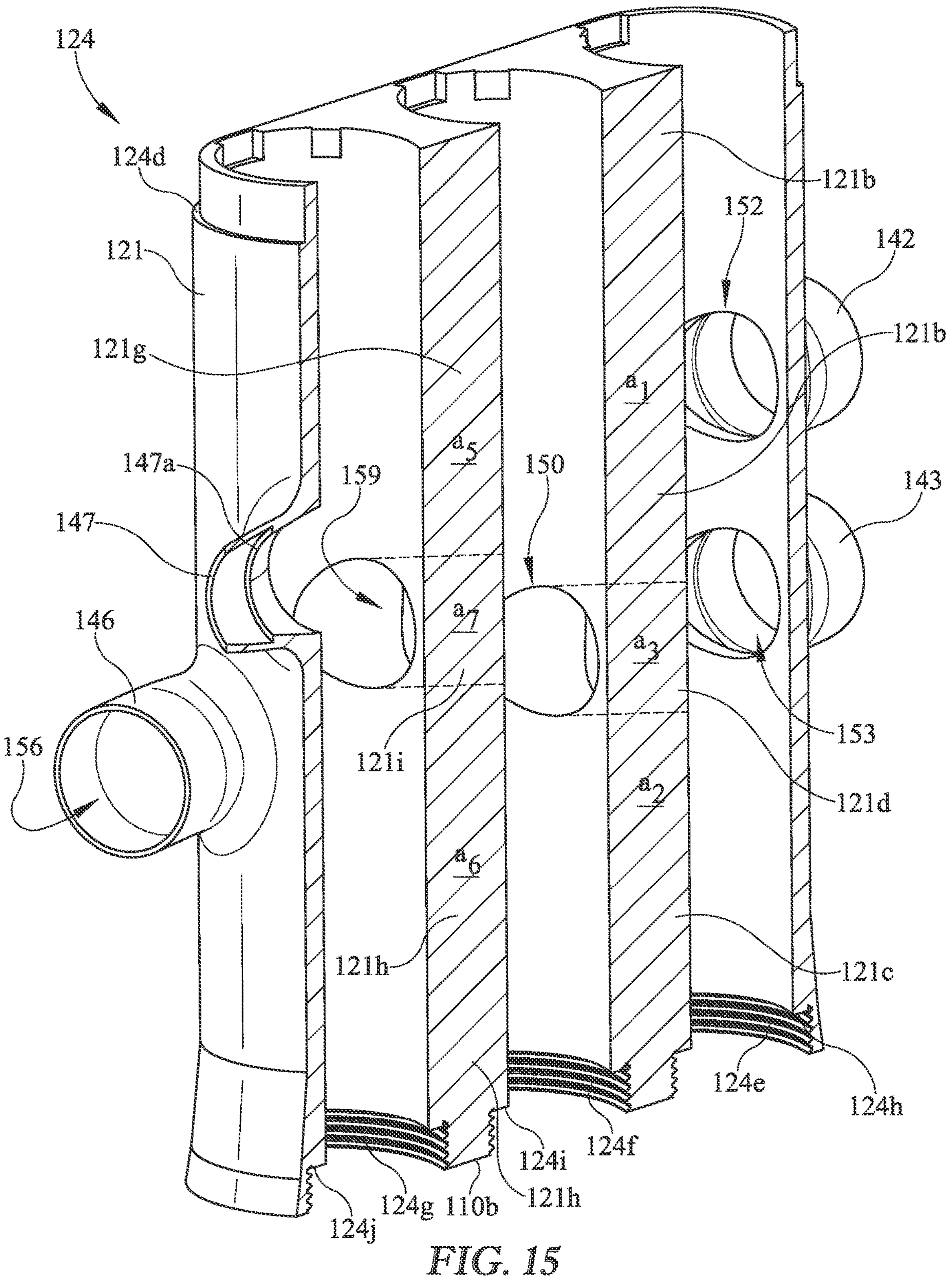
FIG. 15 is a sectional view of a lower body member of the exemplary valve casing of the valve system of FIG. 3.
Figure 16:
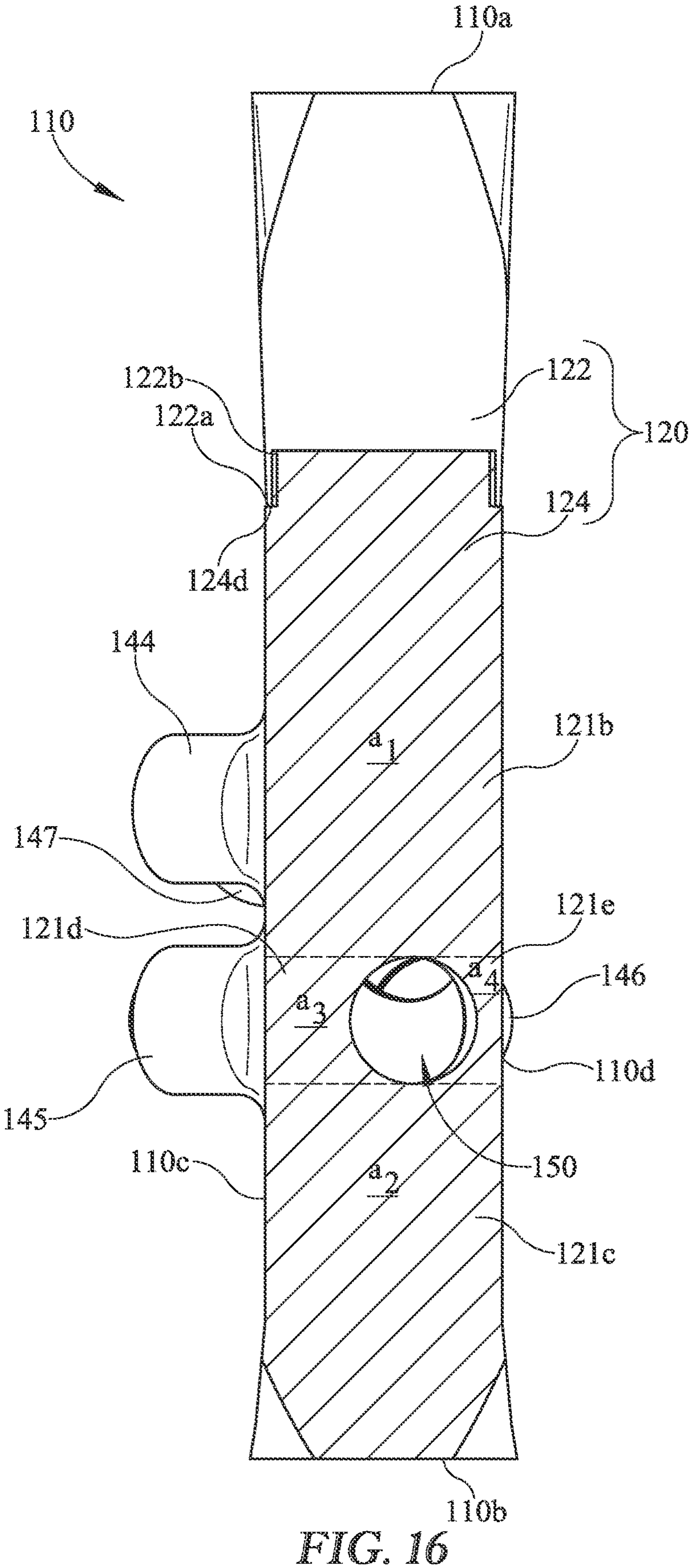
FIG. 16 is a cross-sectional view of the exemplary valve casing of the valve system of FIG. 3 taken along line 16-16 in FIG. 10.

Referring now specifically to FIGS. 14-16, in this exemplary embodiment, the areas $a_1$, $a_2$, $a_3$, $a_4$, $a_5$, $a_6$, $a_7$ of the valve casing 110 which are located (i) between adjacently positioned channels 132, 134, 136 and (ii) adjacent to, above, or below one of the inner ports 150, 159 are completely filled by a mass. In this exemplary embodiment, there are eight such areas: a first area, $a_1$, which extends between the first channel 132 and the second channel 134 and extends from a top 110*a* of the valve casing 110 to the first inner port 150; a second area, $a_2$, which extends between the first channel 132 and the second channel 134 and extends from a bottom 110*b* of the valve casing 110 to the first inner port 150; a third area, $a_3$, which extends between the first channel 132 and the second channel 134 and extends between the first inner port 150 and a first face 110*c* of the valve casing 110; a fourth area, $a_4$, which extends between the first channel 132 and the second channel 134 and extends between the first inner port 150 and a second face 110*d* of the valve casing 110; a fifth area, $a_5$, which extends between the second channel 134 and the third channel 136 and extends from the top 110*a* of the valve casing 110 to the second inner port 159; a sixth area, $a_6$, which extends between the second channel 134 and the third channel 136 and extends from a bottom 110*b* of the valve casing 110 to the second inner port 159; a seventh area, $a_7$, which extends between the second channel 134 and the third channel 136 and extends between the second inner port 159 and the first face 110*c* of the valve casing 110; and an eighth area (not shown) which extends between the second channel 134 and the third channel 136 and extends between the second inner port 159 and the second face 110*d* of the valve casing 110 in similar fashion as the fourth area, $a_4$.

Figure 2:
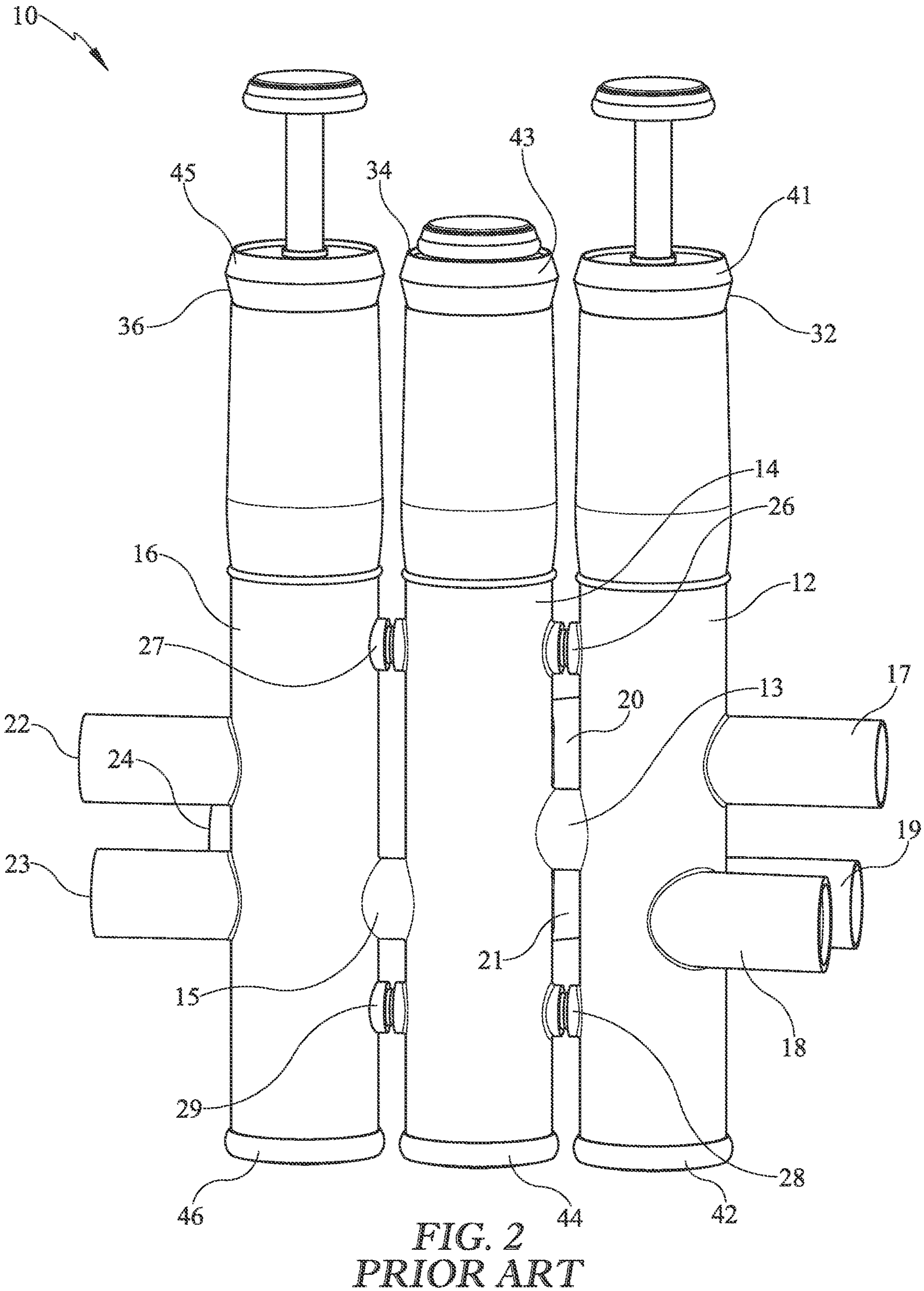
FIG. 2 PRIOR ART
FIG. 2 is a rear perspective view of the prior art valve system of FIG. 1.

Referring still to FIGS. 14-16, as shown, in this exemplary embodiment, the masses filling the eight areas $a_1$, $a_2$, $a_3$, $a_4$, $a_5$, $a_6$, $a_7$ between adjacently positioned channels 132, 134, 136 are defined by portions of the body 120, and, more specifically, different portions 121*a*, 121*b*, 121*c*, 121*d*, 121*e*, 121*f*, 121*g*, 121*h*, 121*i* of the central body portion 121 of the body 120. In other words, the eight areas $a_1$, $a_2$, $a_3$, $a_4$, $a_5$, $a_6$, $a_7$ between adjacently positioned channels 132, 134, 136 are filled by different portions of the body 120. Thus, in this exemplary embodiment, in addition to defining the first channel 132, the second channel 134, and the third channel 136, the body 120 also fills the eight areas $a_1$, $a_2$, $a_3$, $a_4$, $a_5$, $a_6$, $a_7$ between such channels 132, 134, 136. Accordingly, unlike valve systems of known construction, such as that shown in FIGS. 1 and 2, in which the space between the individual valve casings is unfilled except for the space occupied by small metal balusters which form no part of the individual valve casings in which valves are received, in this exemplary embodiment, there is effectively no unfilled space between adjacently positioned channels 132, 134, 136 in the valve casing 110, except where the first inner port 150 and the second inner port 159 are located.

Referring now to FIGS. 3-5 and 14-16, the increased mass and rigidity provided by virtue of the first area, $a_1$, the second area, $a_2$, the third area, $a_3$, the fourth area, $a_4$, the fifth area, $a_5$, the sixth area, $a_6$, the seventh area, $a_7$, and the eighth area being filled reinforces, and reduces the degree of vibration incurred by, the interior surfaces the valve casing 110 which define the first channel 132, the second channel 134, and the third channel 136 as air is directed through the valve casing 110 and the valves 160, 170, 180 of the valve system 100 are manipulated by a user. Without wishing to be bound by any particular theory, it is believed that a musical instrument 50 including the valve system 100 will experience a reduction in acoustic loss and exhibit improved sound characteristics as compared to similar musical instruments employing valve systems of known construction as a result of the exemplary valve casing's 110 increased resistance to vibration. The reinforcement provided by the mass deposits in the first area, $a_1$, the second area, $a_2$, the third area, $a_3$, the fourth area, $a_4$, the fifth area, $a_5$, the sixth area, $a_6$, the seventh area, $a_7$, and the eighth area may also serve to reduce bending of the interior surfaces of the valve casing 110 which define the first channel 132, the second channel 134, and the third channel 136 during transport or in instances where the valve casing 110 is dropped.

Preferably, the entirety of each of the first area, $a_1$, the second area, $a_2$, the third area, $a_3$, the fourth area, $a_4$, the fifth area, $a_5$, the sixth area, $a_6$, the seventh area, $a_7$, and the eighth area is filled by a mass to maximize the reduction in the degree of vibration incurred by the interior surfaces of the valve casing defining the first channel 132, the second channel 134, and the third channel 136. It is appreciated, however, that the degree of vibration incurred by such surfaces may still be attenuated, at least to some degree, and reduce acoustic loss even in instances where each of the first area, $a_1$, the second area, $a_2$, the third area, $a_3$, the fourth area, $a_4$, the fifth area, $a_5$, the sixth area, $a_6$, the seventh area, $a_7$, and the eighth area are not completely filled by a mass. Accordingly, alternative embodiments in which some or all of the first area, $a_1$, the second area, $a_2$, the third area, $a_3$, the fourth area, $a_4$, the fifth area, $a_5$, the sixth area, $a_6$, the seventh area, $a_7$, and the eighth area are only partially filled by a mass are also contemplated. Alternative embodiments in which some, but not all, of the first area, $a_1$, the second area, $a_2$, the third area, $a_3$, the fourth area, $a_4$, the fifth area, $a_5$, the sixth area, $a_6$, the seventh area, $a_7$, and the eighth area are filled, in any capacity, are also contemplated. For instance, in one alternative embodiment, only the first area, $a_1$, may be filled in full or in part by a mass. It is generally preferred, however, that the portion of one or more of the first area, $a_1$, the second area $a_2$, the third area $a_3$, the fourth area $a_4$, the fifth area, $a_5$, the sixth area, $a_6$, the seventh area, $a_7$, and the eighth area be filled by a mass or a combination of discrete masses which individually or collectively, respectively, have a volume which is greater than that of a metal baluster typically used within the art to interconnect individual valve casings within valve systems of known construction. In some embodiments, one or more of the first area, $a_1$, the second area $a_2$, the third area $a_3$, the fourth area $a_4$, the fifth area, $a_5$, the sixth area, $a_6$, the seventh area, $a_7$, and the eighth area may be filled by a mass or a combination of discrete masses that individually or collectively, respectively, have a diameter which exceeds that of conventional balusters typically used in the instrument for which the valve casing 110 is intended for use in. For instance, in embodiments in which the valve casing 110 is intended for use in a trumpet, one or more of the first area, $a_1$, the second area $a_2$, the third area $a_3$, the fourth area $a_4$, the fifth area, $a_5$, the sixth area, $a_6$, the seventh area, $a_7$, and the eighth area may be filled by a mass or a combination of discrete masses that individually or collectively, respectively, have a diameter greater than about seven millimeters (7 mm) to about ten millimeters (10 mm).

Preferably, the first area, $a_1$, the second area, $a_2$, the third area, $a_3$, the fourth area, $a_4$, the fifth area, $a_5$, the sixth area, $a_6$, the seventh area, $a_7$, and/or the eighth area is partially or completely filled by portions 121*a*, 121*b*, 121*c*, 121*d*, 121*e*, 121*f*, 121*g*, 121*h*, 121*i* of the central body portion 121 of the body 120 to maximize the structural integrity of the valve casing 110 in such areas. Alternative embodiments in which an external filler material forming no part of the body 120 is deposited in the first area, $a_1$, the second area, $a_2$, the third area, $a_3$, the fourth area, $a_4$, the fifth area, $a_5$, the sixth area, $a_6$, the seventh area, $a_7$, and/or the eighth area and joined to an exterior of the body 120 (e.g., via soldering, brazing, or welding) of the valve casing 110 are, however, also contemplated herein.

Referring now to FIGS. 4-16, in this exemplary embodiment, the body 120 of the valve casing 110 is comprised of a first (upper) body member 122 and a second (lower) body member 124. In this exemplary embodiment, each respective body member 122, 124 defines certain features of the valve casing 110 and is comprised of a single, unitary piece of material. Specifically, and as perhaps best shown in FIGS. 4 and 14, the upper body member 122 defines a first part of the central body portion 121, and the lower body member 124 defines a second part of the central body portion 121 as well as the plurality of protuberances 141, 42, 143, 144, 145, 146, 147, 148. Accordingly, in this exemplary embodiment, each body member 122, 124 of the body 120 partially defines the first channel 132, the second channel 134, and the third channel 136. That is, the upper body member 122 defines a first portion of the first channel 132, the second channel 134, and the third channel 136, and the lower body member 124 defines a second portion of the first channel 132, the second channel 134, and the third channel 136. In this exemplary embodiment, both the inner ports 150, 159 and the outer ports 151, 152, 153, 154, 155, 156, 157, 158 of the valve casing 110 are defined entirely by the lower body member 124.

Referring now to FIGS. 5 and 14-16, to ensure the first valve 160, the second valve 170, and the third valve 180 are properly deposited within the first channel 132, the second channel 134, and the third channel 136, respectively, when the valve system 100 is in use, in this exemplary embodiment, the lower body member 124 defines at least one groove for each channel 132, 134, 136 of the valve casing 110. Each groove is sized to receive a valve guide (tab) 163, 173, 183 of the first valve 160, the second valve 170, or the third valve 180. In this exemplary embodiment, the top of the lower body member 124 defines a pair of grooves for each channel 132, 134, 136 of the valve casing 110. That is, the top of the lower body member 124 defines a first pair of grooves **124*a* for the first channel 132 which are configured to receive two tabs 163 of the first valve 160 (of which only one is shown in FIG. 5), a second pair of grooves 124*b* for the second channel 134 which are configured to receive two tabs 173 of the second valve 170 (of which only one is shown in FIG. 5), and a third pair of grooves 124*c* for the third channel 136 which are configured to receive two tabs 183 of the third valve 180 (of which only one is shown in FIG. 5). As further shown, in this exemplary embodiment, the lower body member 124 also defines a ledge 124*d* which extends around the perimeter of the lower body member 124, and upon which the upper body member 122 can be seated. In this exemplary embodiment, the bottom of the upper body member 122 includes an outer edge 122*a* that corresponds to the shape and size of the ledge 124*d* defined by the lower body member 124. In this exemplary embodiment, the bottom of the upper body member 122 also defines a recess 122*b* (FIGS. 14 and 16). The recess 122*b* is sized to receive the top of the lower body member 124, such that, when the outer edge 122*a* of the upper body member 122 is placed on the ledge 124*d* of the lower body member 124, the top of the lower body member 124 defining the first pair of grooves 124*a*, the second pair of grooves 124*b*, and the third pair of grooves 124*c* is nested within the recess 122*b* of the upper body member 122 (FIG. 14**).

Referring now to FIGS. 5-7, 10, 11, 14, and 15, to mate with the threaded body of the top valve caps 162, 172, 182 and the bottom valve caps 164, 174, 184 of the first valve 160, the second valve 170, and the third valve 180, each end of the first channel 132, the second channel 134, and the third channel 136 is preferably defined by a threaded portion **122*c*, 122*d*, 122*e*, 124*e*, 124*f*, 124*g* of the body 120. Specifically, in this exemplary embodiment, the interior surfaces of the upper body member 122 which define a first end of the first channel 132, the second channel 134, and the third channel 136 are threaded to receive the top valve cap 162 of the first valve 160, the top valve cap 172 of the second valve 170, and the top valve cap 182 of the third valve 180. Similarly, in this exemplary embodiment, the interior surfaces of the lower body member 124 which define a second end of the first channel 132, the second channel 134, and the third channel 136 are threaded to receive the bottom valve cap 164 of the first valve 160, the bottom valve cap 174 of the second valve 170, and the bottom valve cap 184 of the third valve 180. In this exemplary embodiment, the upper body member 122 also defines an interior ledge 122*f*, 122*g*, 122*h* for each channel 132, 134, 136 which limits the extent to which the top valve caps 162, 172, 182 of the first valve 160, the second valve 170, and the third valve 180 can be screwed into the first channel 132, the second channel 134, and the third channel 136, respectively. Similarly, in this exemplary embodiment, the lower body member 124 also defines an interior ledge 124*h*, 124*i*, 124*j* for each channel 132, 134, 136 which limits the extent to which the bottom valve caps 164, 174, 184 of the first valve 160, the second valve 170, and the third valve 180 can be screwed into the first channel 132, the second channel 134, and the third channel 136**, respectively.

In use, and referring now again to FIG. 3, the valve casing 110 will ordinarily be utilized as part of a valve-based musical instrument 50. As such, the valve casing 110 is configured to be placed in fluid communication with other various components of the musical instrument which either direct a flow of air generated by a user to the valve casing 110, direct the flow of air back into the valve casing 110 subsequent to being emitted therefrom, and/or direct the flow of air out of the musical instrument. Accordingly, when integrated into the musical instrument 50 shown in FIG. 3, a standard three-valve trumpet, the valve casing 110 will ordinarily be placed in fluid communication with, and receive a flow of air from, a main tuning slide 54 that is in fluid communication with and receives the flow of air from a lead pipe 52, which itself is in fluid communication with and receives the flow of air from a mouthpiece 51 of the musical instrument. The valve casing 110 will also typically be placed in fluid communication with a first valve slide 56, a second valve slide 58, and a third valve slide 60 which, like the main tuning slide 54, can be manipulated to tune the trumpet to a desired intonation, and which are configured to initially receive the flow of air from the valve casing 110 and subsequently redirect the flow of air back into the valve casing 110. Further, within a standard, three-valve trumpet, the valve casing 110 will ordinarily be placed in fluid communication with the tail 62 of the bell 64 of the trumpet so that the flow of air can be emitted from the trumpet after traveling through the valve casing 110.

Figure 17:
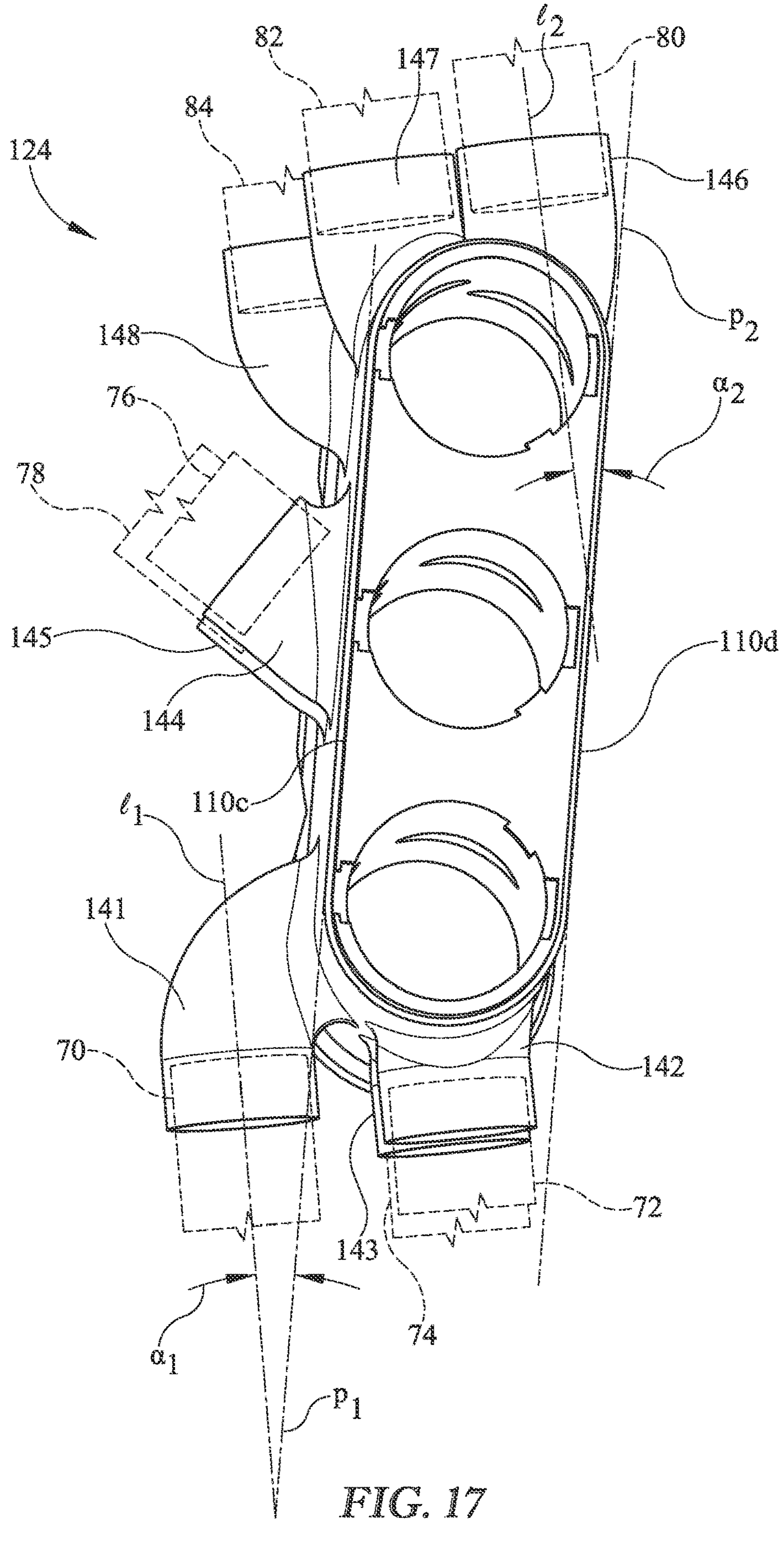
FIG. 17 is an annotated top view of the lower body member of the exemplary valve casing of the valve system of FIG. 3, with the lower body member coupled to a plurality of conduits.

Referring now to FIGS. 3 and 17, the valve casing 110 is placed in fluid communication with the main tuning slide 54, the first valve slide 56, the second valve slide 58, the third valve slide 60, and the tail 62 of the bell 64 of the musical instrument 50 by coupling such components to the protuberances 141, 142, 143, 144, 145, 146, 147, 148 defining the outer ports 151, 152, 153, 154, 155, 156, 157, 158 of the valve casing 110. In this exemplary embodiment, the valve casing 110 is indirectly coupled to the foregoing components of the musical instrument 50 via a plurality of intermediate (or interconnecting) conduits 70, 72, 74, 76, 78, 80, 82, 84. Unlike in valve systems of known construction in which metal ferrules (or unions) receive both the connecting tubes of the valve system and another component of the musical instrument 50 (e.g., the main tuning slide, first slide valve, second slide valve, third slide valve, or tail of the bell) therein, in this exemplary embodiment, a first end of the intermediate conduits 70, 72, 74, 76, 78, 80, 82, 84 is deposited within the outer ports 151, 152, 153, 154, 155, 156, 157, 158 of the valve casing 110 while a second end of the intermediate conduits 70, 72, 74, 76, 78, 80, 82, 84 is deposited within the component of the musical instrument to which it corresponds. Accordingly, in this exemplary embodiment, the protuberances 141, 142, 143, 144, 145, 146, 147, 148 of the valve casing 110 are sized so that the diameter of the outer ports 151, 152, 153, 154, 155, 156, 157, 158 defined thereby substantially corresponds to, but can receive, the outer diameter of the intermediate conduit 70, 72, 74, 76, 78, 80, 82, 84 to which it corresponds, and each respective intermediate conduit 70, 72, 74, 76, 78, 80, 82, 84 is sized to be received in the component of the musical instrument 50 to which it corresponds, or an additional conduit configured to interconnect the intermediate conduit 70, 72, 74, 76, 78, 80, 82, 84 to such component. Sizing the protuberances 141, 142, 143, 144, 145, 146, 147, 148 and the outer ports 151, 152, 153, 154, 155, 156, 157, 158 defined thereby in this way can thus eliminate the need for additional ferrules (unions). By eliminating the need for additional ferrules (unions) to connect various slide tubes to the various ports of the valve casing, as is consistent with traditional trumpet design and construction methods, fewer parts are required for manufacturing and fewer manufacturing steps are required, thus reducing overall cost. Furthermore, acoustic loss by means of attenuation of sound traveling through multiple materials is lessened by reducing the need for additional ferrules. However, in alternative embodiments, the protuberances 141, 142, 143, 144, 145, 146, 147, 148 and the outer ports 151, 152, 153, 154, 155, 156, 157, 158 defined thereby may be sized to facilitate joining of the valve casing 110 to other components of a musical instrument in accordance with known techniques (i.e., utilizing the ferrules (unions) eliminated by the exemplary embodiment described above).

Referring still to FIGS. 3 and 17, in this exemplary embodiment, the main tuning slide 54 of the musical instrument 50 is coupled to the first protuberance 141 of the valve casing 110 by first depositing a first end of a first intermediate conduit 70 within the first outer port 151. Once deposited, the first intermediate conduit 70 is joined to the first protuberance 141 (e.g., via soldering). Once joined to the first protuberance 141, the second end of the first intermediate conduit 70 is then deposited into an arm of the main tuning slide 54 of the musical instrument 50 or another conduit configured to interconnect the first intermediate conduit to the arm of the main tuning slide 54. The first valve slide 56 of the musical instrument 50 is coupled to the second protuberance 142 and the third protuberance 143 of the valve casing 110. The first valve slide 56 is coupled to the second protuberance 142 by first depositing a first end of a second intermediate conduit 72 within the second outer port 152. Once deposited, the second intermediate conduit 72 is joined to the second protuberance 142 (e.g., via soldering). Once joined to the second protuberance 142, the second end of the second intermediate conduit 72 is then deposited into a first arm of the first valve slide 56 or another conduit configured to interconnect the second intermediate conduit 72 to the first arm of the first valve slide 56. The first valve slide 56 is coupled to the third protuberance 143 by first depositing a first end of a third intermediate conduit 74 within the third outer port 153. Once deposited, the third intermediate conduit 74 is joined to the third protuberance 143 (e.g., via soldering). Once joined to the third protuberance 143, the second end of the third intermediate conduit 74 is then deposited into a second arm of the first valve slide 56 or another conduit configured to interconnect the third intermediate conduit 74 to the second arm of the first valve slide 56. The second valve slide 58 is coupled to the fourth protuberance 144 and the fifth protuberance 145 using a fourth intermediate conduit 76 and a fifth intermediate conduit 78, and the third valve slide 60 is coupled to the seventh protuberance 147 and the eighth protuberance 148 using a seventh intermediate conduit 82 and an eighth intermediate conduit 84, in similar fashion. The tail 62 of the bell 64 of the musical instrument 50 is coupled to the sixth protuberance 146 using a sixth intermediate conduit 80 in similar fashion as described above for the coupling of the main tuning slide 54 to the first protuberance 141 of the valve casing 110.

Referring now to FIGS. 4, 6, 8, 12, 13, and 15, in this exemplary embodiment, the annular walls **141*a*, 142*a*, 143*a*, 144*a*, 145*a*, 146*a*, 147*a*, 148*a* defined by each protuberance 141, 142, 143, 144, 145, 146, 147, 148 limit the extent to which the intermediate conduits 70, 72, 74, 76, 78, 80, 82, 84 can be deposited into the outer ports 151, 152, 153, 154, 155, 156, 157, 158. To reinforce and improve the dent resistance of the protuberances 141, 142, 143, 144, 145, 146, 147, 148 the thickness, t, of each protuberance 141, 142, 143, 144, 145, 146, 147, 148 is preferably greater than that typically exhibited by the connecting tubes of valve systems of known construction. In this regard, and in some embodiments, the thickness, t, of each protuberance 141, 142, 143, 144, 145, 146, 147, 148** may range from about 1.0 millimeters to about 2.5 millimeters.

Referring now specifically to FIG. 17, in this exemplary embodiment, the first protuberance 141 defining the first outer port 151 of the valve casing 110 is curved, such that, when a conduit for directing a flow of air, which, in this example, is the first intermediate conduit 70, is deposited in the first outer port 151, a first longitudinal axis, $l_1$, defined by such conduit and a plane, $p_1$, along which the first face **110*c* of the valve casing 110 resides intersect at an angle, $\alpha_1$. Of course, the curvature of the first protuberance 141 can be adjusted at the time of manufacture to provide the desired angle of intersection. In some embodiments, the angle, $\alpha_1$, at which the first longitudinal axis, $l_1$, defined by the conduit received in the first port 151 and the plane, $p_1$, along which the first face 110*c* of the valve casing 110 resides intersect may range between about one degree (1°) to about twenty degrees (20°). In some embodiments, such angle, $\alpha_1$, may range between about three degrees (3°) and fifteen degrees (15°). In some embodiments, such angle, $\alpha_1$, is between about three degrees (3°) and about twelve degrees (12°). It is appreciated that the first longitudinal axis, $l_1$, can be defined by the entirety of the conduit received in the first port 151 or a portion thereof. In this regard, in instances where the conduit received in the first port 151 is a straight conduit, the first longitudinal axis, $l_1$, is considered to be defined by the entirety such conduit. Conversely, in instances where the conduit received in the first port 151 possesses some curvature along its length, the first longitudinal axis, $l_1$, is considered to be defined by the portion of the conduit that is received in the first port 151**.

Referring still to FIG. 17, as shown, in this exemplary embodiment, the sixth protuberance 146 defining the sixth outer port 156 of the valve casing 110 is also curved. Specifically, the sixth protuberance 146 is curved, such that, when a conduit for directing a flow of air, which, in this example, is the sixth intermediate conduit 80, is deposited in the sixth outer port 156, a second longitudinal axis, $l_2$, defined by such conduit and a plane, $p_2$, along which the second face **110*d* of the valve casing 110 resides intersect at an angle, $\alpha_2$. The curvature of the first protuberance 141 can be adjusted to provide the desired angle of intersection. In some embodiments, the angle, $\alpha_2$, at which the second longitudinal axis, $l_2$, defined by the conduit received in the sixth port 156 and the plane, $p_2$, along which the second face 110***d* of the valve casing 110 resides intersect may range between about one degree (1°) to about twenty degrees (20°). In some embodiments, such angle, $\alpha_2$, may range between about three degrees (3°) and fifteen degrees (15°). In some embodiments, such angle, $\alpha_2$, is about three degrees (3°) to about twelve degrees (12°). It is appreciated that the second longitudinal axis, $l_2$, can be defined by the entirety of the conduit received in the sixth port 156 or a portion thereof. In this regard, in instances where the conduit received in the sixth port 156 is a straight conduit, the second longitudinal axis, $l_2$, is considered to be defined by the entirety of such conduit. Conversely, in instances where the conduit received in the sixth port 156 possesses some curvature along its length, the second longitudinal axis, $l_2$, is considered to be defined by the portion of the conduit that is received in the sixth port 156.

Referring now again to FIGS. 3 and 17, as a result of the curvature of the first protuberance 141 and the sixth protuberance 146, the valve casing 110, and thus valve system 100 as a whole, is oriented at an angle relative to both the lead pipe 52 and the tapered portion of the bell 64 within the musical instrument 50 when placed in fluid communication therewith, instead of being oriented in parallel with such components as with valve-based musical instruments employing valve systems of known construction. In some embodiments, the valve casing 110 is oriented at an angle ranging between about one degree (1°) to about twenty degrees (20°) to both the lead pipe 52 and the tapered portion of the bell 64 when placed in fluid communication therewith. In some embodiments, the valve casing 110 is oriented at an angle ranging between about three degrees (3°) to about fifteen degrees (15°) to both the lead pipe 52 and the tapered portion of the bell 64 when placed in fluid communication therewith. In some embodiments, the valve casing 110 is oriented at an angle ranging between about three degrees (3°) to about twelve degrees (12°) to both the lead pipe 52 and the tapered portion of the bell 64 when placed in fluid communication therewith.

In trumpets employing valve systems of traditional construction, a user's left hand is ordinarily placed in ulnar deviation while the user's right hand controlling the valves is placed in radial deviation while the trumpet is held in a playing position. Conversely, and referring now again to FIGS. 3 and 17, the angled orientation of the disclosed valve system 100 within the musical instrument 50 helps to maintain both hands and wrists of the user in a neutral position, thereby eliminating or reducing the strain incurred by the user while playing the musical instrument 50. In other words, as a result of the angled orientation of the valve system 100, the extent to which a user must rotate their playing hand inwardly toward an unnatural position while holding the musical instrument 50 in a playing position is reduced, which, in turn, reduces the strain imposed on the user while playing the musical instrument 50. In this way, the exemplary valve casing 110 may serve to reduce the occurrence of physical fatigue and/or injury, such as repetitive strain injury, tendonitis, carpal tunnel syndrome, or other injuries common in users who regularly play the trumpet or other valve-based instruments within the brass wind instrument family that traditionally require users to manipulate their playing hand to an unnatural position.

Materials from which the exemplary valve casing 110 may be constructed include, but are not necessarily limited to, sterling silver, stainless steel, nickel silver, brass, bronze, copper, ARGENTIUM®, and combinations thereof. The upper body member 122 and the lower body member 124 of the valve casing 110 can, in some embodiments, be constructed of the same material, while, in other embodiments, the upper body member 122 and the lower body member 124 can be constructed of different materials. Depending on the material utilized, the total weight of the valve casing 110 will vary. In some embodiments the total weight of the valve casing 110 ranges between about 500 grams to about 2,500 grams. In some embodiments, the upper body member 122 and the lower body member 124 are constructed of the same material and the total weight of the valve casing 110 ranges between about 1646 grams and about 2159 grams, as shown in Table 1.

TABLE 1

| | Stainless Steel 304 L 7.85 g/cm$^3$ | Yellow Brass 8.4 g/cm$^3$ | Silicon Bronze 8.53 g/cm$^3$ | Nickel-Silver 8.57 g/cm$^3$ | Copper 8.95 g/cm$^3$ | ARGENTIUM ® 10.3 g/cm$^3$* |
|---|---|---|---|---|---|---|
| Valve Casing Weight (weight range +/− 25%) | 1646 grams | 1761 grams | 1788 grams | 1797 grams | 1876 grams | 2159 grams |

Accordingly, the exemplary valve casing 110 will ordinarily be heavier than valve casings of known construction constructed of the same material. For instance, in one exemplary embodiment in which both the upper body member 122 and the lower body member 124 of the valve casing 110 is constructed of 300-grade brass, the exemplary valve casing 110 exhibits a weight of approximately 1,761 grams, while a traditional valve casing constructed of the same material exhibits a weight of only approximately 181 grams. In the foregoing example, the exemplary valve casing 110 thus exhibits a 873% mass increase over the traditional valve casing. The extra mass within the exemplary valve casing 110 serves to attenuate vibration in the valve casing 110 and reduce acoustic loss to provide improved sound characteristics when a musical instrument including the valve casing 110 is played.

Referring now to FIGS. 4-17, various additive manufacturing and subtractive manufacturing techniques can be employed to manufacture the exemplary valve casing 110. For instance, in some embodiments, the valve casing 110 may be constructed using a combination of casting and Computerized Numeric Control (CNC) machining. In one exemplary method of manufacture employing such techniques, the primary structure of the upper body member 122 and the lower body member 124 of the valve casing 110 is first formed via investment casting. In this regard, the primary structure of the upper body member 122 is prepared by depositing a molten material into a first mold (or cast) including one or more molding plates or blocks that define an internal cavity, which, when filled with the molten material, cause the molten material to assume a shape which corresponds to the general structure of the of the upper body member 122 and defines a first portion of the first channel 132, the second channel 134, and the third channel 136, as well as the outer edge 122*a* and the recess 122*b* of the upper body member 122. The primary structure of the lower body member 124 is prepared by depositing a molten material into a second mold (or cast) including one or more molding plates or blocks that define an internal cavity, which, when filled with the molten material, cause the molten material to assume a shape which corresponds to the general structure of the lower body member 124 and defines the inner ports 150, 159, the outer ports 151, 152, 153, 154, 155, 156, 157, 158, the annular walls 141*a*, 142*a*, 143*a*, 144*a*, 145*a*, 146*a*, 147*a*, 148*a*, and the ledge 124*d* of the lower body member 124 of the valve casing 110.

Referring still to FIGS. 4-17, in the exemplary method of manufacture, after the primary structure of the upper body member 122 is prepared via casting, the upper body member 122 is then threaded to accommodate the threaded body of the top valve caps 162, 172, 182 of the first valve 160, the second valve 170, and the third valve 180. To this end, the interior surfaces of the upper body member 122 which partially define the first portion of the first channel 132, the second channel 134, and the third channel 136, and which are proximal to the top of the upper body member 122 are milled via CNC machining until the threaded portions 122*c*, 122*d*, 122*e* are established. Once the threaded portions 122*c*, 122*d*, 122*e* are established, the upper body member 122 is considered to be fully formed.

Referring still to FIGS. 4-7, after the primary structure of the lower body member 124 is prepared via casting, in the exemplary method of manufacture, the lower body member 124 is bored via CNC machining to form a second portion of the first channel 132, the second channel 134, and the third channel 136. The lower body member 124 is then threaded to accommodate the threaded body of the bottom valve caps 164, 174, 184 of the first valve 160, the second valve 170, and the third valve 180. To this end, the interior surfaces of the lower body member 124 which partially define the second portion of the first channel 132, the second channel 134, and the third channel 136, and which are proximal to the bottom of the lower body member 124 are milled via CNC machining until the threaded portions 124*e*, 124*f*, 124*g* are established. The first pair of grooves 124*a*, the second pair of grooves 124*b*, and the third pair of grooves 124*c* for accommodating the valve guides (tabs) 163, 173, 183 of the first valve 160, the second valve 170, and the third valve 180 are then formed by CNC machining. Once the second portion of the first channel 132, the second channel 134, and the third channel 136, threaded portions 124*e*, 124*f*, 124*g*, and the first pair of grooves 124*a*, the second pair of grooves 124*b*, and the third pair of grooves 124*c* are established, the lower body member 124 is considered to be fully formed.

Referring still to FIGS. 4-17, once fully formed, in the exemplary method of manufacture, the outer edge 122*a* of the upper body member 122 is seated on the ledge 124*d* defined by the lower body member 124 and the upper body member 122 and the lower body member 124 are fixed together using known joining techniques. In some implementations, the upper body member 122 and the lower body member 124 may be fixed together via silver brazing. Of course, other suitable techniques for fixing the upper body member 122 and the lower body member 124 together (e.g., other brazing techniques, soldering, welding, and the like) may be employed without departing from the spirit and scope of the present disclosure. Interior surfaces and/or exterior surfaces of the upper body member 122 and/or the lower body member 124 may optionally be ground, buffed, and/or polished.

Referring now to FIGS. 3-17, as each respective channel 132, 134, 136 of the valve casing 110 is, in this exemplary embodiment, collectively defined by two components (i.e., the upper body member 122 and the lower body member 124) that each comprise a single, unitary piece of material and are joined together, unlike valve systems of known construction, the valve system 100 including the exemplary valve casing 110 does not require the use of separate, individual valve casings to accommodate the valves 160, 170, 180 of the valve system 100. Furthermore, as a result of each respective inner port 150, 159 and each respective outer port 151, 152, 153, 154, 155, 156, 157, 158 of the valve casing 110 being defined by a single component (i.e., the lower body member 124) as to be in fluid communication with at least one of the first channel 132, the second channel 134, and the third channel 136, further unlike valve systems of known construction, the valve system 100 does not require individual valve casings to be bored and joined with a series of connecting tubes in order to place the first channel 132, the second channel 134, and the third channel 136 in fluid communication with each other and other components of the musical instrument 50 in which the valve system 100 is integrated. In this way, the exemplary valve casing 110 thus significantly reduces both the labor and costs required for the manufacture of valve casings and thus valve systems as a whole.

Although the exemplary valve casing 110 described with reference to FIGS. 3-17 is primarily identified herein as being comprised of only two components (i.e., the upper body member 122 and the lower body member 124 joined together), alternative embodiments, in which the valve casing 110 is comprised of more than two components are also contemplated. For instance, in some alternative embodiments, the upper body member 122 and the lower body member 124 may actually comprise multiple members which are joined together to form the upper body member 122 and/or the lower body member 124 and still potentially reduce the labor and costs required to manufacture the valve system as compared to valve systems of known construction. For example, in one such alternative embodiment, the lower body member 124 may be comprised of two members which are joined together and collectively define the second, lower portion of the first channel 132, the second channel 134, and the third channel 136.

Although the primary structures of the upper body member 122 and the lower body member 124 are referred to as being formed via investment casting in the above-described exemplary method of manufacture, it is appreciated that the primary structures of the upper body member 122 and the lower body member 124 can be similarly formed via injection molding or other suitable molding techniques without departing from the spirit and scope of the present disclosure. Furthermore, it should be appreciated that while the primary structure of upper body member 122 is identified as being formed via casting in the above-described exemplary method of manufacture, alternative embodiments in which the primary structure of the upper body member 122 is formed via subtractive manufacturing, i.e., removing material from a single unit of material (e.g., a metal block or metal billet) until the single unit forms the primary structure of the upper body member 122. Additionally, while CNC machining is identified as the subtractive manufacturing technique employed in the above-described exemplary method of manufacture, it should be appreciated that other subtractive manufacturing techniques (e.g., Electrical Discharge Machining (EDM)) may additionally or alternatively be employed without departing from the spirit and scope of the present disclosure.

Methods of manufacture in which the upper body member 122 and/or the lower body member 124 are partially or fully formed via three-dimensional (3D) printing are also contemplated herein. That is, the upper body member 122 and/or the lower body member 124 may, in some embodiments, be defined by a plurality of additively deposited layers of material. For instance, in some cases, the primary structure of the upper body member 122 and the lower body member 124 may be formed via three-dimensional printing and then subtractive manufacturing techniques, such as CNC machining, employed to finish forming the upper body member 122 and the lower body member 124. One suitable 3D printer which may be utilized to additively deposit the layers of material to form the upper body member 122 and/or the lower body member 124 is the 3D4BRASS printer, manufactured by 3D4MEC S.r.l., of Sasso Marconi, Italy. Of course other suitable 3D printers may alternatively be utilized without departing from the spirit and scope of the present disclosure.

Although the valve casing 110 is primarily descried in the context of including multiple body members 122, 124 joined together, alternative embodiments in which the valve casing 110 consists of a single body member that is manufactured by additively depositing layers of material from the ground up as to form the channels 132, 134, 136, inner ports 150, 159, and outer ports 151, 152, 153, 154, 155, 156, 157, 158 described above are also contemplated herein. In such embodiments, once the primary structure of the valve casing 110 is formed, the interior surfaces defining the channels 132, 134, 136 and the outer ports 151, 152, 153, 154, 155, 156, 157, 158 may be ground and polished as to minimize or eliminate the "stair-step" effect created during the printing process. In such embodiments, the valve casing 110 may be fully formed during the printing process. That is, in some implementations, the threading to accommodate the threaded body of the top valve caps 162, 172, 182 and the threaded body of the bottom valve caps 164, 174, 184 of the first valve 160, the second valve 170, and the third valve 180 and the grooves for receiving the valve guides (tabs) of the first valve 160, the second valve 170, and the third valve 180 may be established during the printing process. In other embodiments, such threading and/or grooves may be established by employing a subtractive manufacturing process, such as CNC machining.

As reflected in the discussion above, the valve system 100 disclosed herein can be utilized as a component which forms a part of, and can be selectively manipulated to affect the sound emitted by, a musical instrument 50. Thus, in another aspect the present disclosure is also directed to a musical instrument including: a valve system including some or all of the features of the valve system 100 described above with reference to FIGS. 3-17; a first conduit in fluid communication with the valve system 100 and configured to receive a flow of air into the musical instrument; and a second conduit in fluid communication with the valve system 100 and configured to direct the flow of air out of the musical instrument. Embodiments in which the first conduit and/or the second conduit are directly connected to the valve system 100 as well embodiments in which the first conduit and/or the second conduit are indirectly connected to the valve system 100, e.g., via an intermediate conduit 70 or intermediate conduit 80, are contemplated herein. In some embodiments, the musical instrument is a three-valve trumpet that includes a mouthpiece, a lead pipe in fluid communication with the mouthpiece, a main tuning slide in fluid communication with the lead pipe and the valve system 100, a first valve slide in fluid communication with the valve system 100, a second valve slide in fluid communication with the valve system 100, a third valve slide in fluid communication with the valve system 100, and a bell in fluid communication with the valve system 100.

Although the valve system 100 is primarily described and illustrated herein in the context of being for and integrated in a standard, three-valve trumpet, or associated with components thereof, it should be appreciated that the utility of the exemplary valve casing 110 described herein is not necessarily limited to such application. Rather, the exemplary valve casing 110 described herein, may be utilized with, or adapted to accommodate, other valve-based instruments within the brass wind instrument family. It should therefore, in turn, be appreciated that the valve casing 110 described may, in alternative embodiments, be placed in fluid communication with components of a different instrument. Additionally, while the valve casing 110 is primarily described as including three channels 132, 134, 136 for valves 160, 170, 180, alternative embodiments in which the valve casing 110 includes fewer than three channels as well as embodiments in which the valve casing 110 includes more than three channels are also contemplated herein. Furthermore, while the valve casing 110 is primarily described herein as including a total of ten ports 150, 151, 152, 153, 154, 155, 156, 157, 158, 159, alternative embodiments in which the valve casing 110 includes fewer than ten ports as well as embodiments in which the valve casing 110 includes more than ten ports are also contemplated herein. For instance, in some embodiments, to accommodate instruments utilizing four valves, such as some piccolo trumpets, flugelhorns, baritone horns, and tubas, the valve casing 110 may include a total of four channels and the number of inner ports and/or outer ports adjusted to accommodate such instruments.

One of skill in the art will recognize that additional embodiments and implementations are also possible without departing from the teachings of the present disclosure. This detailed description, and particularly the specific details of the exemplary embodiments and implementations disclosed therein, is given primarily for clarity of understanding, and no unnecessary limitations are to be understood therefrom, for modifications will become obvious to those skilled in the art upon reading this disclosure and may be made without departing from the spirit or scope of the disclosure.

All publications, patents, and patent applications mentioned in this specification are herein incorporated by reference to the same extent as if each individual publication, patent, or patent application was specifically and individually indicated to be incorporated by reference, including the references set forth in the following references list:

REFERENCES

1. Wilfried Kausel, Daniel W. Zietlow, and Thomas R. Moore. Influence of wall vibrations on the sound of brass wind instruments. J. Acoust. Soc. Am., Vol. 128, No. 5 pp. 3161-3174 (November 2010).

2. Vasileios Chatziioannou, Saranya Balasubramanian, and Wilfried Kausel. VIBROACOUSTIC ANALYSIS OF TRUMPET WALL VIBRATIONS. ICSV26, Montreal (July 2019).

What is claimed is:

1. A valve casing for a valve-based musical instrument, comprising:

a body, the body defining a plurality of channels configured to receive a plurality of valves for directing a flow of air received by the valve casing, and a plurality of ports, the plurality of ports including one or more inner ports, with each inner port of the one or more inner ports placing two adjacently positioned channels of the plurality of channels in fluid communication with each other, and a plurality of outer ports for directing the flow of air out of the valve casing or receiving the flow of air into the valve casing;

wherein one or more areas located between adjacently positioned channels of the plurality of channels is at least partially filled by a mass.

2. The valve casing as recited in claim 1, wherein each area of the one or more areas located between adjacently positioned channels of the plurality of channels is located adjacent to, above, or below an inner port of the one or more inner ports.

3. The valve casing as recited in claim 2, wherein the one or more areas located between adjacently positioned channels of the plurality of channels include a first area, the first area extending between a first pair of adjacently positioned channels of the plurality of channels and extending from a top of the valve casing to a first inner port of the one or more inner ports, a second area, the second area extending between the first pair of adjacently positioned channels of the plurality of channels and extending from a bottom of the valve casing to the first inner port of the one or more inner ports, a third area, the third area extending between the first pair of adjacently positioned channels of the plurality of channels and extending from the first inner port of the one or more inner ports to a first face of the valve casing, and a fourth area, the fourth area extending between the first pair of adjacently positioned channels of the plurality of channels and extending from the first inner port of the one or more inner ports to a second face of the valve casing.

4. The valve casing as recited in claim 3, wherein the one or more areas located between adjacently positioned channels of the plurality of channels further include a fifth area, the fifth area extending between a second pair of adjacently positioned channels of the plurality of channels and extending from the top of the valve casing to a second inner port of the one or more inner ports, a sixth area, the sixth area extending between the second pair of adjacently positioned channels of the plurality of channels and extending from the bottom of the valve casing to the second inner port of the one or more inner ports, a seventh area, the seventh area extending between the second pair of adjacently positioned channels of the plurality of channels and extending from the second inner port of the one or more inner ports to the first face of the valve casing, and an eighth area, the eighth area extending between adjacently positioned channels of the plurality of channels and extending between the second inner port of the one or more inner ports and a second face of the valve casing.

5. The valve casing as recited in claim 4, wherein at least one of the first area, the second area, the third area, the fourth area, the fifth area, the sixth area, the seventh area, and the eighth area is at least partially filled by a mass defined by a portion of the body.

6. The valve casing as recited in claim 4, wherein the first area, the second area, the third area, the fourth area, the fifth area, the sixth area, the seventh area, and the eighth area are each completely filled by a mass defined by a portion of the body.

7. The valve casing as recited in claim 1, wherein the body is comprised of one or more body members, and wherein each body member of the one or more body members at least partially defines the plurality of channels.

8. The valve casing as recited in claim 7, wherein the one or more areas of the valve casing located between adjacently positioned channels of the plurality of channels is at least partially filled by a mass defined by a portion of a body member of the one or more body members.

9. The valve casing as recited in claim 7, wherein the one or more body members includes a first body member, the first body member defining a first portion of the plurality of channels, and a second body member joined to the first body member, the second body member defining a second portion of the plurality of channels and the plurality of ports.

10. The valve casing as recited in claim 9, wherein the second body member defines one or more grooves for each channel of the plurality of channels, and wherein each groove of the one or more grooves is configured to receive a tab of a valve of the plurality of valves.

11. The valve casing as recited in claim 9, wherein the first body member defines an outer edge and a recess, wherein the second body member defines a ledge upon which the outer edge of the first body member is seated, and wherein a top of the second body member defining the one or more grooves is nested within the recess of the first body member when the outer edge of the first body member is seated on the ledge of the second body member.

12. The valve casing as recited in claim 1, wherein the valve casing weighs between about 500 grams to about 2500 grams.

13. The valve casing as recited in claim 1, wherein the plurality of outer ports includes a first outer port configured to receive a conduit for directing the flow of air, and wherein the first outer port is defined by a portion of the body which is curved, such that, when the conduit is received in the first outer port, a longitudinal axis defined by the conduit and a plane along which a first face of a central portion of the body resides intersect at an angle ranging from about 1° to about 20°.

14. A valve casing for a valve-based musical instrument, comprising:

a body, including a central body portion, the central body portion including a plurality of channels configured to receive a plurality of valves for directing a flow of air received by the valve casing, and one or more inner ports, with each inner port of the one or more inner ports placing two adjacently positioned channels of the plurality of channels in fluid communication with each other, and a plurality of protuberances extending from the central body portion, with each protuberance of the plurality of protuberances defining one or more outer ports for directing the flow of air out of the valve casing or the flow of air into the valve casing;

wherein the plurality of protuberances includes a first protuberance configured to receive a first conduit for directing the flow of air; and wherein the first protuberance is curved, such that, when the first conduit is received in the first protuberance, a longitudinal axis defined by the first conduit and a plane along which a first face of the central body portion resides intersect at an angle ranging from about 1° to about 200.

15. The valve casing as recited in claim 14, wherein the plurality of protuberances includes a second protuberance configure to receive a second conduit for directing the flow of air, and wherein the second protuberance is curved, such that, when the second conduit is received in the first protuberance, a longitudinal axis defined by the second conduit and a plane along which a second face of the central body portion resides intersect at an angle ranging from about 1° to about 20°.

16. The valve casing as recited in claim 15, wherein at least one of (i) the longitudinal axis defined by the first conduit and the plane along which the first face of the central body portion resides and (ii) the longitudinal axis defined by the second conduit and a plane along which the second face of the central body portion resides intersect at an angle ranging from about 3° to about 12°.

17. The valve casing as recited in claim 14, wherein the body is comprised of multiple body members, including a first body member, the first body member defining a first section of the central body portion, and a second body member joined to the first body member, the second body member defining a second section of the central body portion and the plurality of protuberances, and wherein the first section of the central body portion and the second section of the central body portion each partially define the plurality of channels.

18. An assembly for a valve-based musical instrument, comprising:

a valve casing, including a body, including a central body portion, the central body portion including a plurality of channels configured to receive a plurality of valves for directing a flow of air received by the valve casing, and one or more inner ports, with each inner port of the one or more inner ports placing two adjacently positioned channels of the plurality of channels in fluid communication with each other, and a plurality of protuberances extending from the central body portion, with each protuberance of the plurality of protuberances defining one or more outer ports for directing the flow of air out of the valve casing or the flow of air into the valve casing;

a first conduit for directing the flow of air into the valve casing; and a second conduit for directing the flow of air away from the valve casing;

wherein the plurality of protuberances includes a first protuberance in which the first conduit is received;

wherein the first protuberance is curved, such that, when the first conduit is received in the first protuberance, a longitudinal axis defined by the first conduit received in the first protuberance and a plane along which a first face of the central body portion resides intersect at an angle ranging from about 1° to about 20°;

wherein the plurality of protuberances includes a second protuberance in which the second conduit is received; and wherein the second protuberance is curved, such that, when the second conduit is received in the second protuberance, a longitudinal axis defined by the second conduit received in the second protuberance and a plane along which a second face of the central body portion resides intersect at an angle ranging from about 1° to about 20°.

19. The assembly as recited in claim 18, wherein the valve-based musical instrument is a trumpet including a lead pipe, a main tuning slide in fluid communication with the lead pipe, and a bell, wherein first conduit is in fluid communication with the main tuning slide, and wherein the second conduit is in fluid communication with a tail of the bell.

* * * * *